(12) United States Patent
Strassner

(10) Patent No.: US 10,013,414 B2
(45) Date of Patent: Jul. 3, 2018

(54) SYSTEM AND METHOD FOR METADATA ENHANCED INVENTORY MANAGEMENT OF A COMMUNICATIONS SYSTEM

(71) Applicant: Futurewei Technologies, Inc., Plano, TX (US)

(72) Inventor: John Charles Strassner, San Jose, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 774 days.

(21) Appl. No.: 14/464,381

(22) Filed: Aug. 20, 2014

(65) Prior Publication Data

US 2016/0055142 A1 Feb. 25, 2016

(51) Int. Cl.
*G06F 17/27* (2006.01)
*G06Q 10/06* (2012.01)
*G06Q 30/02* (2012.01)

(52) U.S. Cl.
CPC ....... *G06F 17/2705* (2013.01); *G06Q 10/067* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,464,145 B2 | 12/2008 | Strassner | |
| 7,542,956 B2 | 6/2009 | Strassner et al. | |
| 7,558,847 B2 | 7/2009 | Strassner | |
| 8,010,650 B2 | 8/2011 | Strassner | |
| 8,019,838 B2 | 9/2011 | Jiang et al. | |
| 8,078,553 B2 | 12/2011 | Strassner et al. | |
| 8,195,827 B2 | 6/2012 | Strassner | |
| 8,327,414 B2 | 12/2012 | Strassner et al. | |

(Continued)

FOREIGN PATENT DOCUMENTS

| | | |
|---|---|---|
| CN | 1886935 A | 12/2006 |
| EP | 1793529 A1 | 6/2007 |

(Continued)

OTHER PUBLICATIONS

"Metadata", from Wikipedia, Aug. 22, 2017, XP055400411Retrieved from the Internet:URL:https://en.wikipedia.org/w/index.php?title=Metadataandoldid=621353207, 14 pages.

*Primary Examiner* — Hosain Alam
*Assistant Examiner* — Tuan-Khanh Phan
(74) *Attorney, Agent, or Firm* — Slater Matsil, LLP

(57) ABSTRACT

A method for management entity operations includes parsing a request to collect data for an entity in a communications system, the parsing to produce a parsed request and dependency information related to the request, and generating sets of model elements in accordance with context tokens and content tokens derived from the parsed request, the content tokens including extrinsic metadata and intrinsic metadata of the parsed request. The method also includes generating a platform-neutral description of results of the request from an optimized graph derived from the sets of model elements, executing the request to collect the data as requested, and storing the data as collected.

34 Claims, 16 Drawing Sheets

(56) References Cited

U.S. PATENT DOCUMENTS

| | | | |
|---|---|---|---|
| 2002/0188513 A1* | 12/2002 | Gil | G06Q 10/08 705/22 |
| 2004/0230681 A1 | 11/2004 | Strassner et al. | |
| 2005/0289168 A1* | 12/2005 | Green | G06F 17/3064 |
| 2007/0288419 A1 | 12/2007 | Strassner | |
| 2007/0288467 A1 | 12/2007 | Strassner et al. | |
| 2008/0059613 A1 | 3/2008 | Strassner | |
| 2008/0065616 A1 | 3/2008 | Brown | |
| 2008/0071714 A1 | 3/2008 | Menich et al. | |
| 2008/0120327 A1 | 5/2008 | Bhat | |
| 2008/0126287 A1 | 5/2008 | Cox et al. | |
| 2008/0161941 A1 | 7/2008 | Strassner et al. | |
| 2008/0271022 A1 | 10/2008 | Strassner et al. | |
| 2008/0271111 A1 | 10/2008 | Cox et al. | |
| 2009/0164499 A1 | 6/2009 | Samudrala et al. | |
| 2009/0165078 A1 | 6/2009 | Samudrala et al. | |
| 2009/0324107 A1* | 12/2009 | Walch | G06K 9/00872 382/224 |
| 2009/0327172 A1 | 12/2009 | Liu et al. | |
| 2009/0328133 A1 | 12/2009 | Strassner et al. | |
| 2011/0145278 A1 | 6/2011 | Maes | |
| 2011/0296015 A1 | 12/2011 | Chakravarty et al. | |
| 2015/0286371 A1* | 10/2015 | Degani | G06F 17/274 705/14.64 |

FOREIGN PATENT DOCUMENTS

| | | |
|---|---|---|
| EP | 2339513 A1 | 6/2011 |
| EP | 2372954 A2 | 10/2011 |
| WO | 2004008283 A2 | 1/2004 |
| WO | 2007143259 A2 | 12/2007 |
| WO | 2007146463 A2 | 12/2007 |
| WO | 2008024539 A2 | 2/2008 |
| WO | 2008028234 A1 | 3/2008 |
| WO | 2008082763 A2 | 7/2008 |
| WO | 2008082771 A1 | 7/2008 |
| WO | 2008134273 A1 | 11/2008 |
| WO | 2008134274 A1 | 11/2008 |
| WO | 2009002697 A1 | 12/2008 |
| WO | 2009158462 A2 | 12/2009 |

\* cited by examiner

SYSTEM AND METHOD FOR METADATA ENHANCED INVENTORY MANAGEMENT OF A COMMUNICATIONS SYSTEM

TECHNICAL FIELD

The present disclosure relates generally to digital communications, and more particularly to a system and method for metadata enhanced inventory management of a communications system.

BACKGROUND

Communications systems have changed life in the modern world by enabling users access to a wide range of services. As an example, a first user may remotely access a work computer using a laptop from home or a conference room while on a business trip, a second user may visually verify that his children has arrived home safely from a day at school on his desktop computer at work, a third user may watch a favorite movie on a smart telephone, a fourth user may initiate the cooking of dinner from a digital tablet, and the like.

In order to support such a wide range of users, services, and access technologies, the communications systems have become increasingly complex. Additionally, the number of hardware and software components, as well as hardware and software types, making up the communications systems has also increased. The increased complexity of the communications systems, along with increased number and type of hardware and software components, help to make the configuration and management of the communications systems more difficult and potentially error prone.

SUMMARY OF THE DISCLOSURE

Example embodiments of the present disclosure which provide a system and method for metadata enhanced inventory management of a communications system.

In accordance with an example embodiment of the present disclosure, a method for management entity operations is provided. The method includes parsing, by the management entity, a request to collect data for an entity in a communications system, the parsing to produce a parsed request and dependency information related to the request, and generating, by the management entity, sets of model elements in accordance with context tokens and content tokens derived from the parsed request, the content tokens including extrinsic metadata and intrinsic metadata of the parsed request. The method also includes generating, by the management entity, a platform-neutral description of results of the request from an optimized graph derived from the sets of model elements, and executing, by the management entity, the request to collect the data as requested. The method further includes storing, by the management entity, the data as collected.

In accordance with another example embodiment of the present disclosure, a management entity is provided. The management entity includes a processor, and a memory operatively coupled to the processor. The processor parses a request to collect data for an entity in a communications system, the parsing produces a parsed request and dependency information, generates sets of model elements in accordance with context tokens and content tokens derived from the parsed request, the content tokens including extrinsic metadata and intrinsic metadata of the parsed request, generates a platform-neutral description of results of the request from an optimized graph derived from the sets of model elements, and executes the request to collect the data as requested. The memory stores the data as collected.

In accordance with another example embodiment of the present disclosure, a management environment is provided. The management environment includes a communications system being managed, and a management entity operatively coupled to the communications system. The management entity parses a request to collect data for an entity in the communications system, the parsing produces a parsed request and dependency information, generates sets of model elements in accordance with context tokens and content tokens derived from the parsed request, the content tokens including extrinsic metadata and intrinsic metadata of the parsed request, generates a platform-neutral description of results of the request from an optimized graph derived from the sets of model elements, executes the request to collect the data as requested, and stores the data as collected.

One advantage of an embodiment is that the use of metadata allows for better description of dependencies that exist between components in a query to enhance the collection of data used in the management of a communications system.

A further advantage of an embodiment is that the improved dependencies provide better insight in how to collect the data used in the management of the communications system.

A further advantage of an embodiment is that metadata may be used to facilitate various operations performed on the system being managed, including but not limited to configuration, monitoring, and other lifecycle operations.

A further advantage of an embodiment is that the use of metadata enables the basic functionality of an application to be defined as metadata, instead of, for example, being hard-coded in a programming language or database.

A further advantage of an embodiment is that the use of metadata enables application developers to work at a much higher level of abstraction, and hence, the developers are shielded from having to worry about low-level system details that the platform handles automatically.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1A:
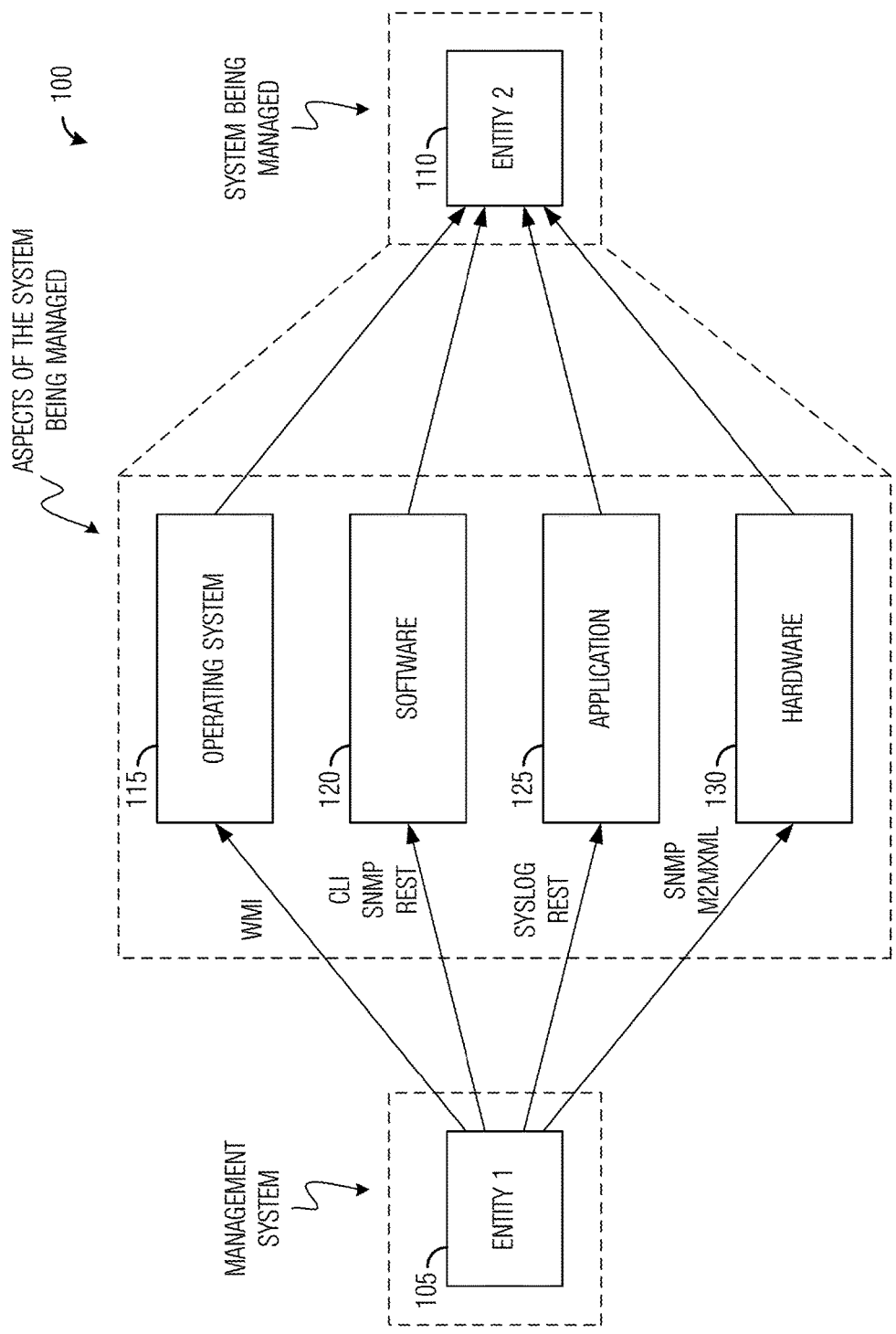
FIG. 1a illustrates an example managed environment, in which a first entity is managing a second entity according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to the use of metadata to better describe both auxiliary data about the objects of interest (e.g., versioning information) as well as a description of dependencies that exist between the objects of interest. This provides better insight in how to collect the data used in the management of the communications system, and avoids hard-coding decisions in software. Instead, the use of metadata enables the basic functionality of an application to be defined as metadata, instead of, for example, being hard-coded in a programming language or database.

A second embodiment of the disclosure relates to how metadata may be used to facilitate various operations performed on the system being managed, including but not limited to configuration, monitoring, and other lifecycle operations.

The present disclosure will be described with respect to example embodiments in a specific context, namely a model-based management system for a communications system, wherein the management system utilizes models to drive the collection of data for the communications system and metadata to enhance the quality of the data being collected. The data being collected may be categorized as operational, administrative, management, and performance data. The communications system may be a standards compliant communications system, such as 3GPP LTE, WiMAX, IEEE 802.11, IEEE 802.16, and the like, a non-standards compliant communications system, or a combination of one or more technical standards compliant communications system with one or more non-standards compliant communications system.

Communications systems are generally dynamic. Not only do their logical topologies change dynamically, new physical devices are added, while existing physical devices are moved or removed. The dynamic nature of communications systems makes maintaining a real-time list of network devices, along with one or more attributes that can be used to identify them (e.g., Internet Protocol (IP) addresses, port information, and the like) challenging. Additionally, new applications, modules, or versions of software (including both operating systems and software applications) may be downloaded, and hardware (e.g., RAM, CPUs, hard drives, solid state memories, network cards, and the like) may be changed.

Network discovery may be scheduled to occur at predefined times and/or intervals; it may also be performed on an as-needed basis. Since a typical communications system is large, such network discovery operations usually involve a large amount of processing. Typically, network discovery is collector-based and multiple scanning methods (such as, ping sweeps, port scans, simple network management protocol (SNMP) scans searching for different types of SNMP attributes, and the like) may be utilized.

However, applications for network inventory vary. High end applications utilize network discovery and generate open systems interconnection (OSI) level 1, 2, and 3 topological views of the communications system. Higher end applications include network devices, operating systems, high-level application data (e.g., CPU, disk, memory uptime, utilization, and the like). Once the views of the communications systems are generated, changes to the communications system can be quickly detected.

There may be dependencies between the type of data being discovered and/or inventoried and the type of protocols being used to discover and/or report the data. There may be an important dependency between the type of protocol used to collect the data and the type of data to be collected. As an example, if SNMP is used, then there are various management information base (MIB) objects defined that differentiate between hosts and "devices that forward datagrams" (e.g., a device that acts as a router). It is noted that this does not mean that the device is a router; for example, a layer three switch may also act as a router. More importantly, (a) other protocols may not have this capability defined, (b) other protocols may define a set of capabilities that have more or less functionality than this capability, and/or (c) this differentiation may not be enough to accurately classify a particular network entity.

As another example, the type of ManageableEntity may have specific attributes and/or behavior that dictate the need to use a specific type of protocol. For example, a port that is defined as a bridge sends bridge packet data units (BPDUs), whereas the same port may send different PDUs for communication at different layers. This is made more complex because higher layers, such as layers 5-7, do not refer to a PDU per se, but rather to the actual data (or transfer of the data).

As yet another example, the selection of the type of data to collect affects the type of protocol to use when looking for specific types of neighbors for a specific entity type. For example, if discovery is performed on a port whose role is a "Provider Edge" role, then in some circumstances, that port can connect to other ports with a role of "Customer Edge", "Provider Edge", or "Provider Core". While in other circumstances, it may be limited to only looking for ports whose role is "Provider Edge". Furthermore, if that same port was using multiprotocol label switching (MPLS), then it could also look for Label Switching Routers as well as ingress, egress, and other types of MPLS routers.

As yet another example, the type of attributes that an entity has when looking for specific types of functionality that a device or port has can also dictate the use of a specific protocol to use, because the data to be retrieved may be very specific. For example, a device may be interested in determining if a node supports neighbor discovery, such as active reservation protocol (ARP) or neighbor discovery protocol (NDP), capability, or how a node obtains its address(es) (e.g., by using bootstrap protocol (BOOTP) or dynamic host configuration protocol (DHCP)).

The above discusses several types of dependencies between protocols used to collect data and the data to be collected. There may also be relationships between the data to be collected and the type(s) of pre- and post-processing operations that should be performed on the collected data to make said data more useful to the management system, and which data (if any) should be stored in what type of repository at what step in the above operations, e.g., pre-processing or post-processing. The set of these dependencies and relationships require coordination and optimization of computational and storage resources. The example embodiments presented herein may use the knowledge represented in an information model to define the characteristics and behavior of model elements that represent ManageableEntities, as well as to represent different types of decision-making and reasoning processes and rules to govern the application of said processes.

FIG. 1a illustrates a managed environment 100, in which a first entity 105 is managing a second entity 110. The first entity is part of a management system, and the second entity is part of a system being managed. It is noted that without loss of generality, the term managing (or management) may refer to both monitoring and/or configuring. It is also noted that although shown as single entities, first entity 105 and second entity 110 may each represent multiple entities.

First entity 105 may manage as well as interact with second entity 110 through one or more levels. As an example, management may occur at an operating system level 115, where first entity 105 may utilize a protocol, such as web management interface (WMI), to manage second entity 110. Management may also occur at a software level 120, where first entity 105 may utilize a protocol, such as command line interface (CLI), SNMP, representational state transfer (REST), and the like, to manage second entity 110. Management may also occur at an application level 125, where first entity 105 may utilize a protocol, such as system log (SYSLOG), REST, and the like, to manage second entity 110. Management may also occur at a hardware level 130, where first entity 105 may utilize a protocol, such as SNMP, machine to machine extensible markup language (M2MXML), and the like, to manage second entity 110. Entities 115, 120, 125, and 130 each represent different aspects of the system being managed; the management system may obtain their current state, values, and/or configuration information from second entity 110, and may then change one or more of these aspects (i.e., entities 115, 120, 125, and 130) as part of its management processes.

The example embodiments presented herein uses an object-oriented information model to define managed entities (e.g., entities in a communications system) of interest. The discussion presented herein will make use of the following terminology:

An information model is an abstraction and representation of the entities in a managed environment. This includes definition of their attributes, operations and relationships. It is independent of any specific type of repository, software usage, or access protocol;

A data model is a concrete implementation of an information model in terms appropriate to a specific type of repository that uses a specific access protocol or protocols. It includes data structures, operations, and rules that define how the data is stored, accessed and manipulated;

A model mapping is a translation from one type of model to another type of model. Model mapping changes the representation and/or level of abstraction used in one model to another representation and/or level of abstraction in another model;

The term model element is a generic term that defines abstractions that can be represented in an information model. Examples include class, attribute, different types of relationships (e.g., associations, aggregations, and compositions), and other constructs;

A PolicyRule is an intelligent container. It contains data that define how the PolicyRule is used in a managed environment as well as a specification of behavior that dictates how the managed entities that it applies to will interact. The contained data is of four types: (1) data and metadata that define the semantics and behavior of the policy rule and the behavior that it imposes on the rest of the system, (2) a set of events that can be used to trigger the evaluation of the condition clause of a policy rule, (3) an aggregated set of policy conditions that, if true, permit the execution of one or more policy actions, and (4) an aggregated set of policy actions that perform one or more operations (e.g., change the configuration of, or collect data from, a given device);

A ManageableEntity is defined as any entity of interest in a managed environment that can perform and/or respond to management functions. Examples of a ManageableEntity include devices (e.g., routers, switches, host computers), entities that are part of a device (e.g., physical ports and logical device interfaces), as well as protocols, applications, servers, and services—in short, anything that can respond to management requests;

A Behavior or Behaviors is represented as a set of model elements that capture four different aspects of managing behavior: (1) a means to uniquely identify the ManageableEntity as a function of context; (2) to manage the functions and roles that a ManageableEntity can produce and consume a set of mechanisms based on different types of policy rules and state automata that execute in a management domain (and between federated management domains), (3) the ability to orchestrate and/or choreograph the behavior of one or more ManageableEntities (orchestration defines the behavior of a set of ManageableEntities from their own point-of-view, while choreography defines the behavior of a set of ManageableEntities from the point-of-view of other ManageableEntities), and (4) the definition of a set of roles (human and machine) that can interact with, use, and/or operate on the ManageableEntity;

Network-based data collection may be defined as the ability to efficiently collect information regarding ManageableEntities accessible in a network. This specifically refers to ManageableEntities at the "parent" as well as "child" levels (e.g., a device and its ports, or an application and the services that it provides);

Agent-based data collection involves using dedicated software running locally on a managed device as part of the management infrastructure; the agent-based software is solely devoted to management (which includes, but may not be limited to, data collection);

Agentless data collection involves collecting data from ManageableEntities without installing any new software on the device that hosts the ManageableEntities on them; the key difference between it and agent-based data collection is that agentless data collection does not involve installing any new software on any machines to be monitored; and Data collection management approach is defined as the combination of a set of data models, protocols, and software that enable collected data to be analyzed, processed, and understood, so that the ManageableEntities that produced the collected data can be monitored and managed.

Figure 1B:
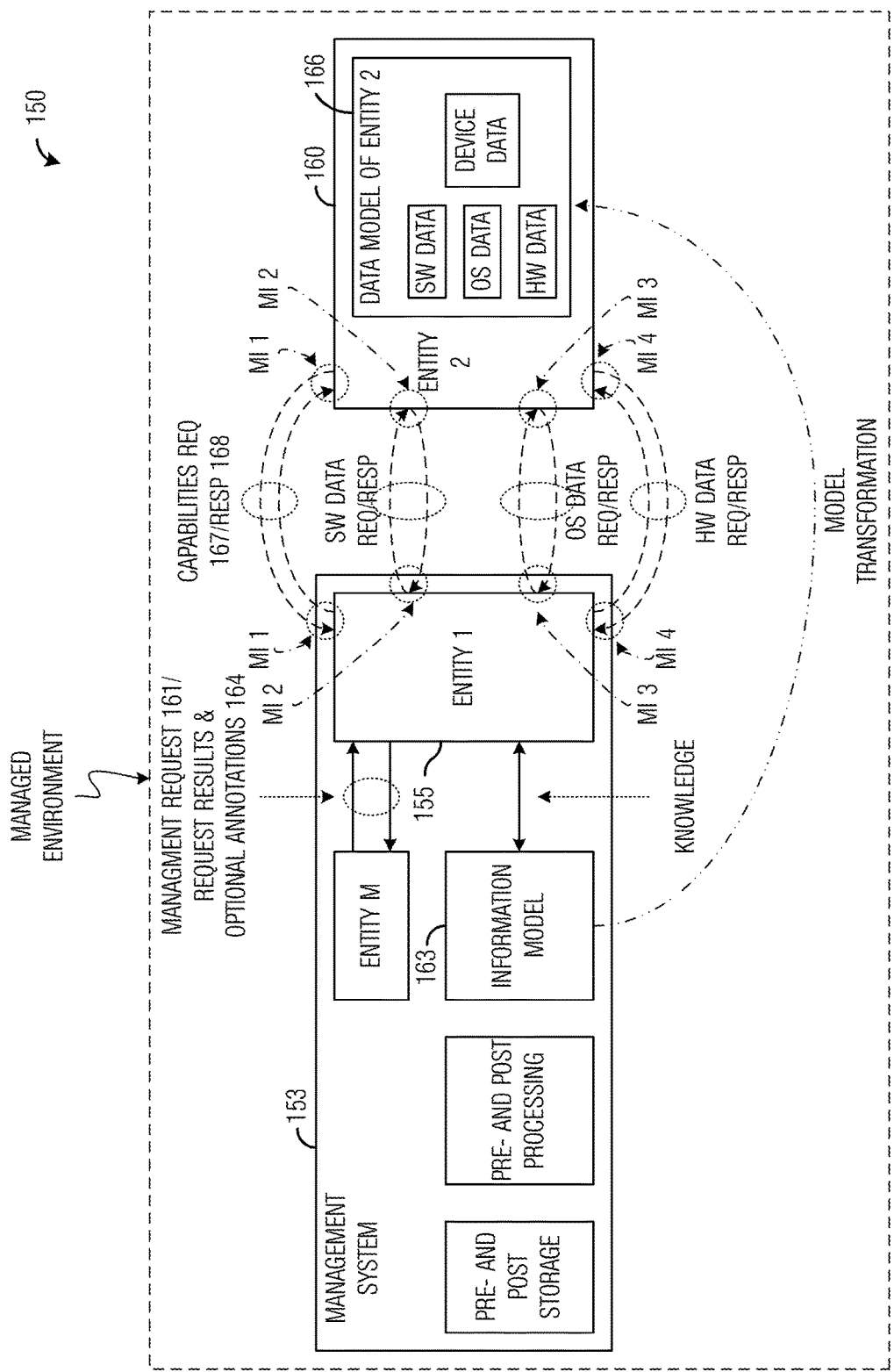
FIG. 1b illustrates an example of a managed environment, consisting of a management system and a second entity according to example embodiments described herein.

FIG. 1b illustrates an example of a managed environment 150, consisting of a management system 153 and a second entity 160. A first entity 155 is a part of management system 153, and is managing second entity 160, which is a part of managed environment 150. Managed environment 150 may receive a management request 161 by first entity 155 to collect data from second entity 160. First entity 155 may consult an information model 163 to determine if any information about second entity 160 is available. Information model 163 defines archetypal information and behavior, in an object-oriented form, that may be thought of as a set of model elements that represent the functionality and behavior of second entity 160. Annotations 164 may also be defined and are used to describe the time, version, and other metadata that define the appropriate set of objects that represent the appropriate instance of second entity 160, and whether such objects have already been defined in one or more data models 166. If insufficient knowledge exists about second entity 160 (e.g., what version of which operating system is it currently running), then first entity 155 may need to exchange one or more messages, e.g., capabilities request 167 and capabilities response 168 messages, with second entity 160 to determine the functionality and behavior that second entity 160 supports. The capabilities request 167 and capabilities response 168 messages may be based on the knowledge contained in information model 163. The exchange of any data, including those shown in this exchange, may comprise two uni-directional exchanges, one for requesting data, and one for returning the data requested.

First entity 165 may examine the data that is requested to be collected from management request 161, and compares this request with the capabilities of second entity 160 in order to determine how best to obtain the data requested. A problem is that many elements in the data collection process may be dependent on each other. As an example, the type of protocol used can affect which data can be collected, and at what frequency, granularity, and other factors. These and other dependencies are modeled using Information Model 163. As an example, the exchange of capabilities request 167 and capabilities response 168 messages define which protocols are supported by both first entity 155 and second entity 160. Using the protocols, first entity 155 may then issue a set of data requests to appropriate ManageableEntities that comprise second entity 160, where each ManageableEntity in second entity 160 may use the same or a separate protocol.

As an illustrative example, a Hypertext Transfer Protocol (Secure) (HTTP(S)) capability request may be sent by first entity 155 to second entity 160 to provide various performance metrics, such as the time since its last reboot, the amount of memory currently being used, and so forth. Such metrics may typically be supported by multiple protocols (e.g., Simple Network Management Protocol (SNMP), System Log (Syslog), Command Line Interface (CLI), and others); however, each protocol may use a different set of resources and have a different accuracy. It is possible that first entity 155, through use of information model 163, will first optimize the request for data from second entity 160 by optimizing the use of the same protocol, where possible, to get the best data possible. The set of ManageableEntities that comprise second entity 160 may be defined by data model 166 of second entity 160 and data model 166 may be derived from information model 163.

Hence, first entity 155 may use a particular protocol with a specific management interface to request specific data from second entity 160 (e.g., WMI for Operating System data, CLI for software, SNMP for hardware, and the like). It is noted that a protocol may be used to support one or more types of data, and that a particular type of data may require multiple protocols to obtain all of the information that constitute a particular type of data (for example, this is illustrated in FIG. 1a by using the combination of CLI, SNMP, and REST to retrieve all of the Software information from second entity 110). These requests then query the appropriate ManageableEntities that are part of second entity 160. Replies to the query or queries may come back through the same management interface of second entity 160 that the requests were received. First entity 155 may then read the collected data, optionally process and store it, and then either notify a requestor of the data that the data is ready or directly send the data to the requestor.

Figure 2A:
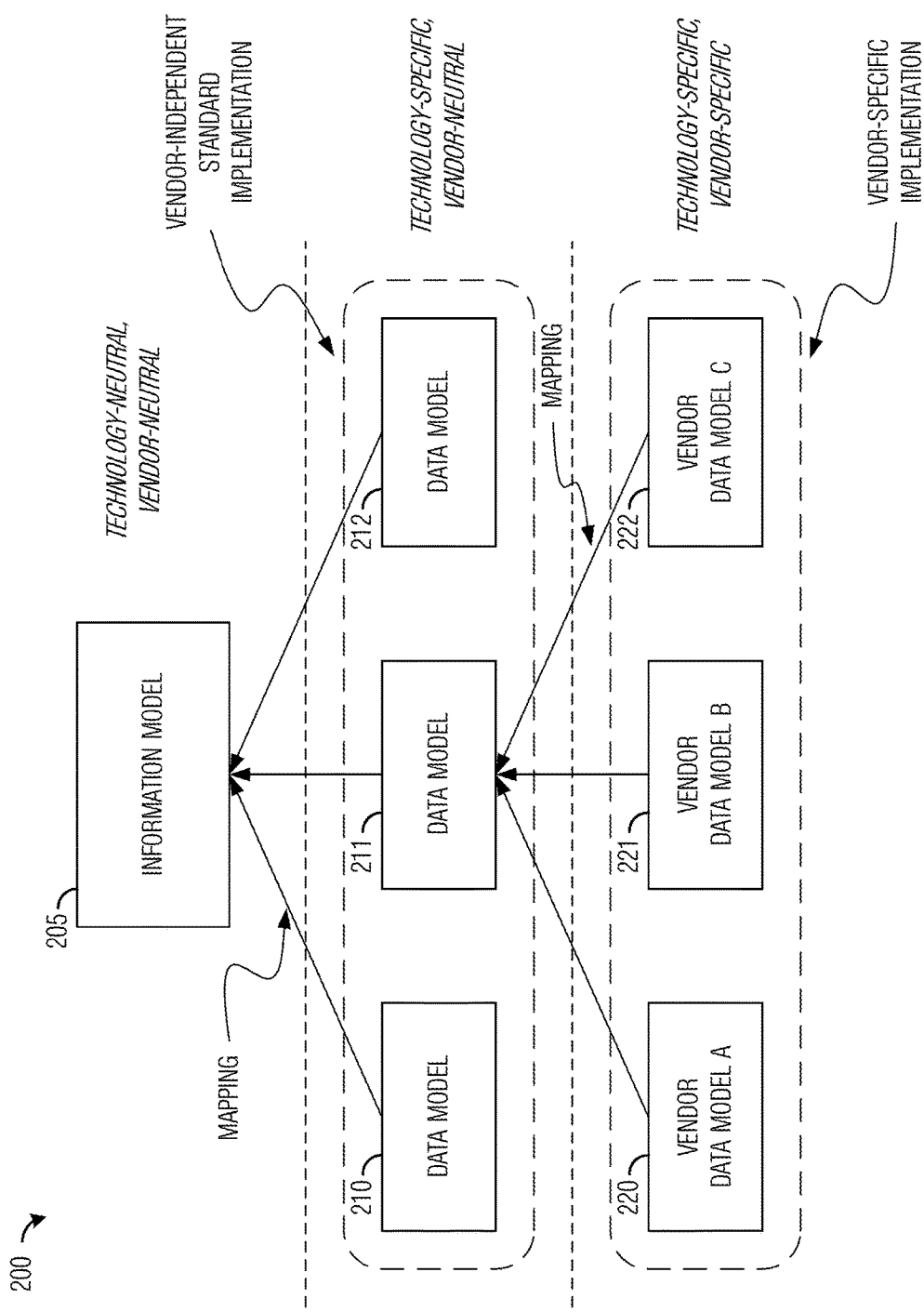
FIG. 2a illustrates an example a relationship and mapping between an information model and a set of data models according to example embodiments described herein.

FIG. 2a illustrates a relationship and mapping between an information model 205 and a set of data models. Conceptually, information model 205 provides a view of the inherent connectedness between data and a managed communications system. Information model 205 enables information, knowledge, wisdom, and the relations, patterns, and principles that they represent to be modeled in a technology-neutral manner. In contrast, data models, such as data models 210-212 and data models 220-222, may be considered to be instances of information model 205. The data models may be derived from information model 205 and can be related to each other, since they share the concepts that are defined in the information model. A difference between an information model and a data model that define the same concepts is the realization of those concepts using technologies, languages, and/or protocols. In general, the information model does not use any platform-, language-, and/or protocol-specific definitions. On the other hand, data models are typically tightly bound to at least one, and usually all, of these three features (platform, language, and protocol).

There may be several types of data models. A first data model type may be a technology-specific but vendor-neutral instantiation of information model 205. As an example, data models 210-212 are technology-specific but vendor-neutral instantiations of information model 205, and could represent concepts using a directory, a relational database, and a flat file. A second data model type is a technology-specific and vendor-specific instantiation of information model 205. As an example, data models 220-222 are technology-specific and vendor specific instantiations of information model 205 as well as data model 211.

Figure 2B:
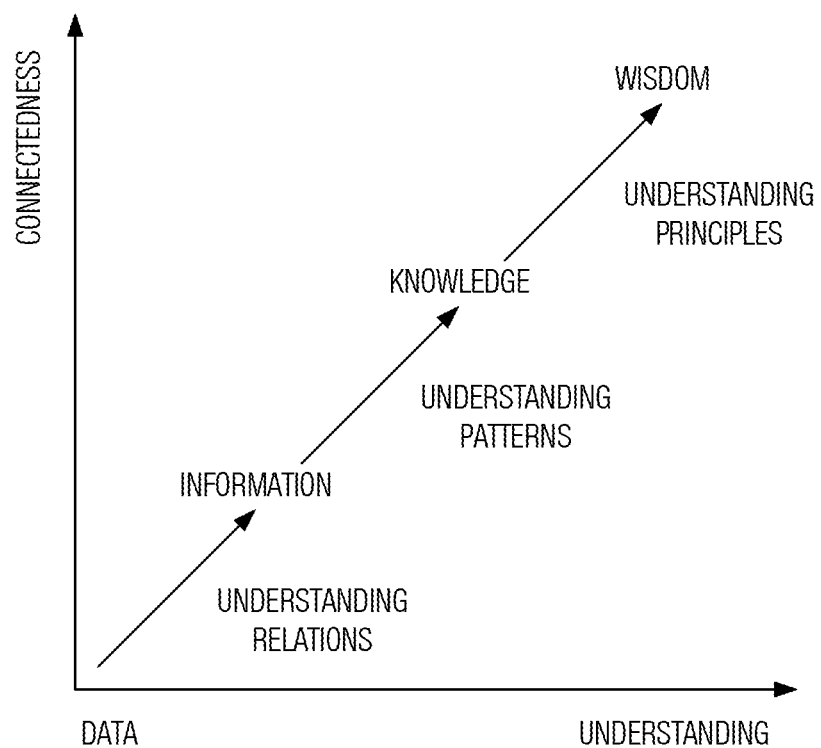
FIG. 2b illustrates an example relationship between the semantics (i.e., understanding) of data and connectedness (i.e., how those data relate to each other and to the current or future context of the system being managed) for data according to example embodiments described herein.

FIG. 2b illustrates a relationship 250 between the semantics (i.e., understanding) of data and connectedness (i.e., how those data relate to each other and to the current or future context of the system being managed) for data. Typically, raw data becomes information when relationships between the raw data are known. Once patterns are known, information may be come knowledge, which in turn, becomes wisdom once principles are known. The information model may be used to define a set of methods that may be used to transform data into information, knowledge, and wisdom.

In general, an information model may:
- contain different types of knowledge that can be collectively organized according to different parameters (e.g., policy, context, and the like); these parameters can be used as context-defined filters to interpret the collected data;
- help to organize relationships between data inferable from collected data with sufficient supporting data;
- organize knowledge by views applicable to a particular constituency or set of constituencies, rather than just a parameter(s);
- define patterns that can be used to define how to collect, aggregate, filter, match, correlate, and perform other processing operations on network data; the operations are possible due to object-oriented class and relationship definitions present in the information model;
- enable different types of protocols to be used that can reveal different types of data about a single network entity or a set of network entities, as well as their mutual constraints;
- be independent of technology, platform, and protocol; enabling the information model to be used to support multiple data models through a set of mappings, making it superior to starting with a particular data model since it abstracts the specification of the network objects and their relationships from how they are to be collected and the implementation of the collection;
- abstract both the specification of the network objects and their relationships from additional enhancements, such as implementation of metadata, reasoning using first order logic, and additional mechanisms;
- enable the collection process to be separated from additional post-collection processing tasks for verifying further behavior that a given network entity has; and
- enable behavior to be defined as a set of concepts, contained in the information model, that define the syntax and static semantics of behavior (static semantics refers to those aspects of behavior that may be defined at design time that affect the state of a ManageableEntity), which may be performed by a set of concepts that can also be defined in the information model, including but not limited to policy rules and state automata.

A benefit of using the information model is that it provides a self-describing set of mechanisms that define how knowledge can be used to describe the semantics of characteristics and behavior of a ManageableEntity, including its attributes and relationships.

Figure 3:
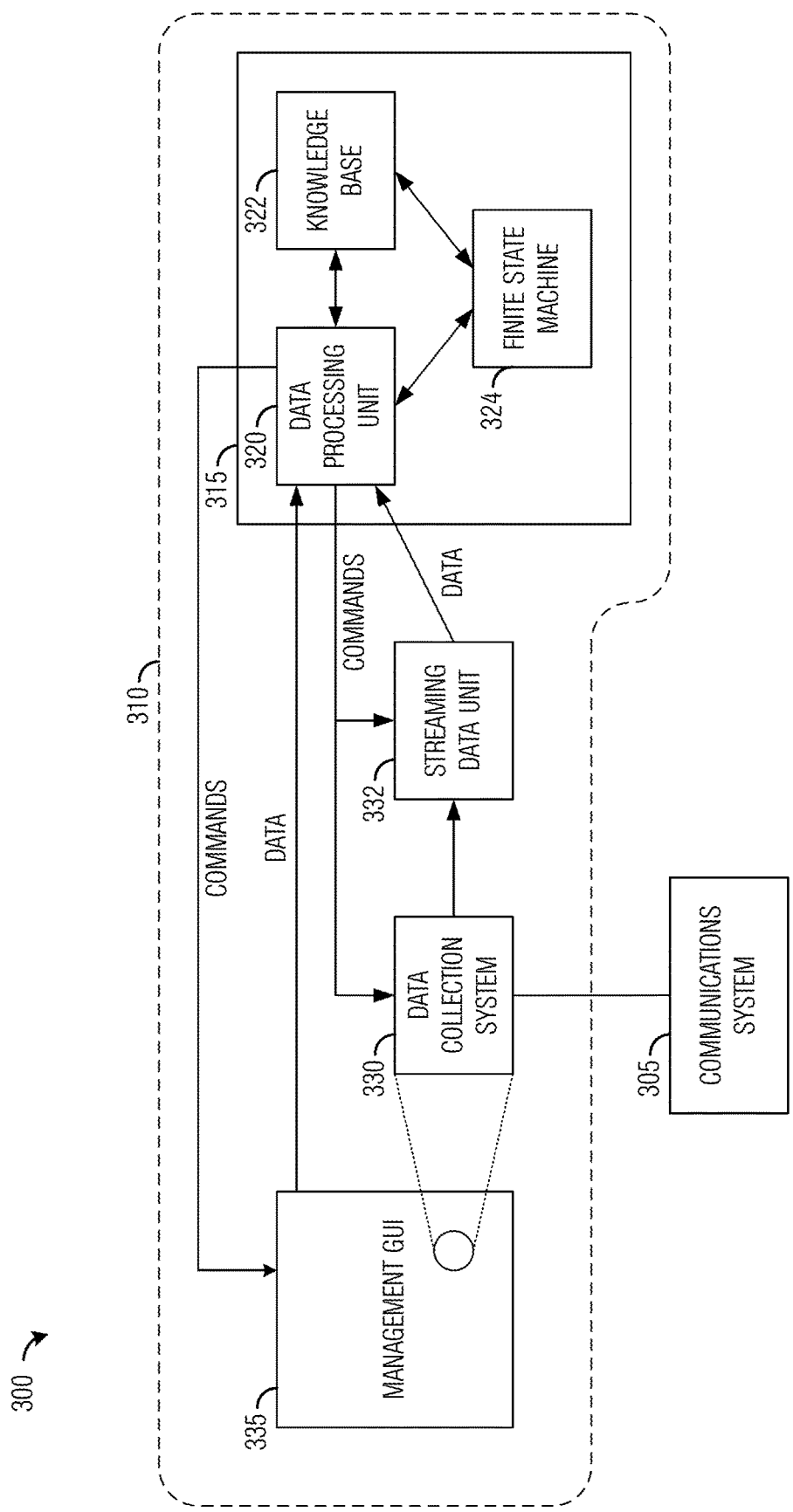
FIG. 3 illustrates an example system including a communications system with an information model based management system according to example embodiments described herein.

FIG. 3 illustrates an example system 300 including a communications system with an information model based management system. System 300 includes a communications system 305 and a management system 310 that may be used to manage communications system 305. Management system 310 includes a management entity 315 that may process data collected from communications system 305 using data processing unit 320. Management system 310 provides a knowledge base 322 that may enable management system 310 to determine which data to collect, how to collect it, and may also include instructions for how to analyze and process the data collected from communications system 305, and the like. Knowledge base 322 may implement an information model of communications system 305, as well as one or more data models thereof. A finite state machine 324 may be used to control the operation of management entity 315.

Management system 310 may also include a data collection system 330 to collect data from entities in communications system 305. Data collection system 330 may make use of one or more protocols as specified by management entity 315 to collect data from communications system 305. Data collection system 330 may stream data using a streaming data unit 332 to management entity 315. The streamed data may be delivered out of order, fragmented, with some data missing, and the like. Some data may be retrieved using specific protocols under specific conditions. A management graphical user interface (GUI) 335 may allow users, such as operators, managers, and the like, to interact with management entity 315, as well as communications system 305.

Dependency Analysis

Figure 4:
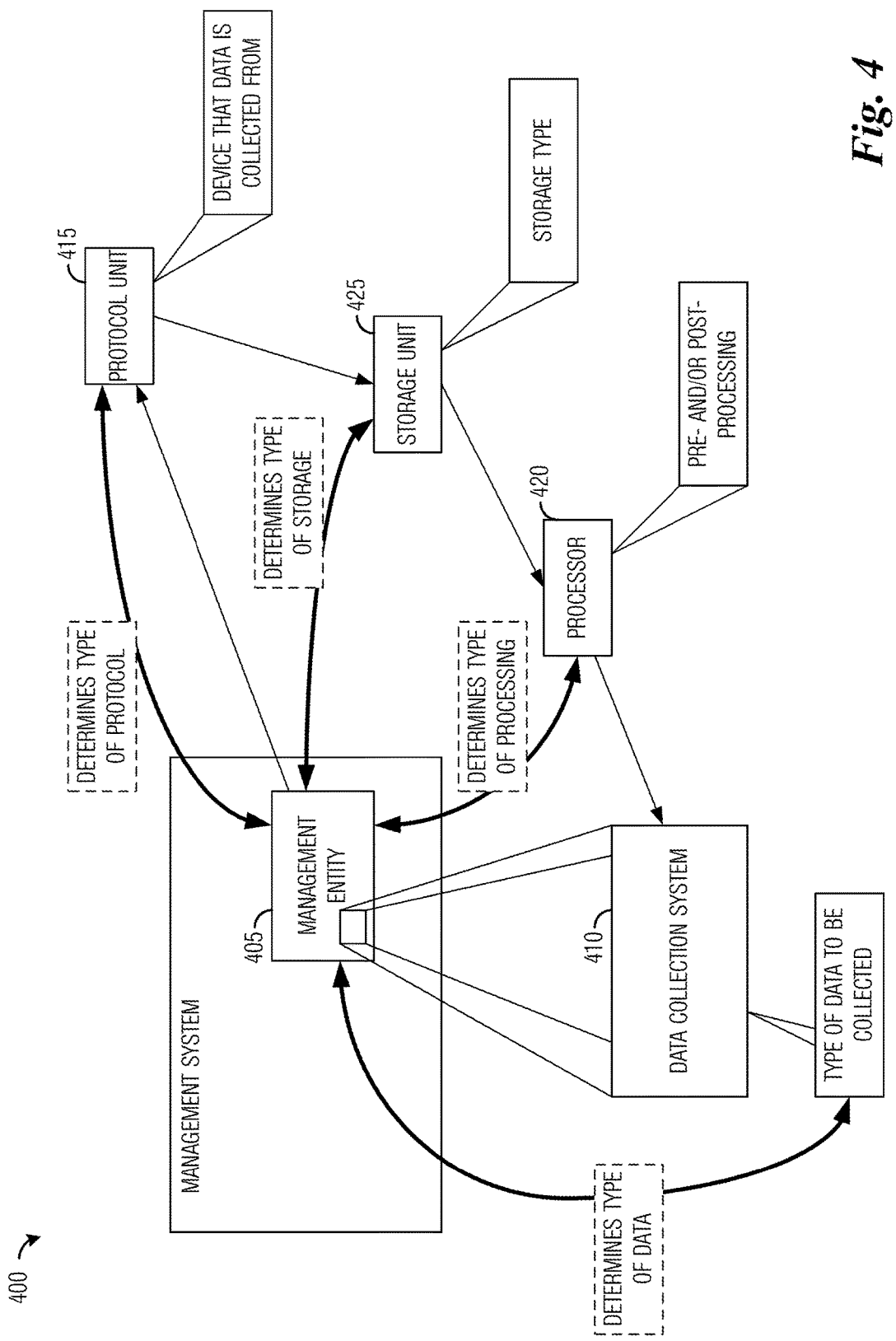
FIG. 4 illustrates an example management system with detail provided for the salient functions of a portion of the management system according to example embodiments described herein.

FIG. 4 illustrates an example management system 400 with detail provided for the salient functions of a portion of the management system. Management system 400 includes a management entity 405 that may determine the type of data to be collected (via a data collection system 410), determine the type of protocol used to collect the data (via a protocol unit 415), determine the type of processing (e.g., pre-processing occurring during the collection of the data and/or post-processing occurring after the collection of the data has been completed) to be provided to the collected data (via a processor 420), and determine a type of storage (e.g., pre-storage, which is temporary storage that is used during the collection of the data, and/or post-storage, which is temporary and/or permanent storage that is used after the collection of the data has been completed) to be used to store the collected data (via a storage unit 425). As discussed previously, an information model of a communications system may be used by management system 400, specifically, management entity 405, to determine the type of data, the type of protocol, the type of processing, and the type of storage required for a given data collection task.

Using an information model of a communications system allows for a common set of model elements that can be used to define interrelated semantics that exist between the type of data to be collected, the type of protocols used to collect the data, the type of pre-processing and post-processing operations that are to be performed on the collected data, which data (if any) should be stored in what type of data repository, and the like. Each of these interrelated semantics may represent dependencies between these fundamental portions of the data collection process. Furthermore, each is uni-directional. For example, the type of data that is to be collected restricts the type of protocol that can be used, since the type of protocol may need to satisfy a number of requirements, including: (1) the protocol may need to be able to transport the data reliably (and possibly securely), meaning that the accuracy of each datum, as well as the entire data set, should not be altered), and (2) the protocol may need to be able to support appropriate operations (e.g., create, read, update, delete, and the like) on the data. Similarly, the protocol constrains the type of data, in that the protocol (1) may need to be able to support the data structures that are used by the data to be collected, and (2) the protocol may need to be semantically compatible with the use of the data. For example, while directories can theoretically store and retrieve any type of data structure, their protocol (e.g., the Lightweight Directory Access Protocol (LDAP) or even its stronger and more robust version, X.500 (a set of standards defining directory services by the ITU-T)) was designed primarily to be used with simple textual search applications. This may place a fundamental limitation on how data can be searched, created, edited, and retrieved in a directory.

If the above dependencies are understood and satisfied, then a unified platform may be built, i.e., a platform that is independent of the technology used to implement the type of protocol, the type of ManageableEntity, the type of data to be collected, the types of pre-processing and post-processing operations to be performed, the types of storage operations and storage to be performed, and the like. In particular, the unified platform allows for:

- a set of reusable abstractions—since protocols, data, pre-processing functions, post-processing functions, data repositories, and storage operations may all be represented as model elements, all exist as reusable objects in the management system;
- a set of patterns to create the reusable abstractions as provided by the information model, which may simplify the resulting design and implementation;
- an extensible set of mechanisms to identify a ManageableEntity, as well as its attributes and behavior since a ManageableEntity may be identified by a set of attributes, relationships, metadata, behavior, and/or structure;
- the ability to direct the collection of data based on intrinsic and extrinsic model elements that represent the ManageableEntity or set of ManageableEntities that data is being collected for;
- the ability to determine whether any additional data should be collected from ManageableEntities that have already been visited (allowed by the virtue of comparing the MangeableEntity data collected to the representation of the ManageableEntity in the information model and determining if data is missing);
- the ability to define which collected data should be stored in which type of data repository (if any) after which type of pre-processing operation and/or post-processing operation (if any) are performed; and
- the ability to define which of the above discussed features (if any) is affected by which types of changes in the context of the environment.

High-Level Overview of the Management System for Collecting Data

Figure 5:
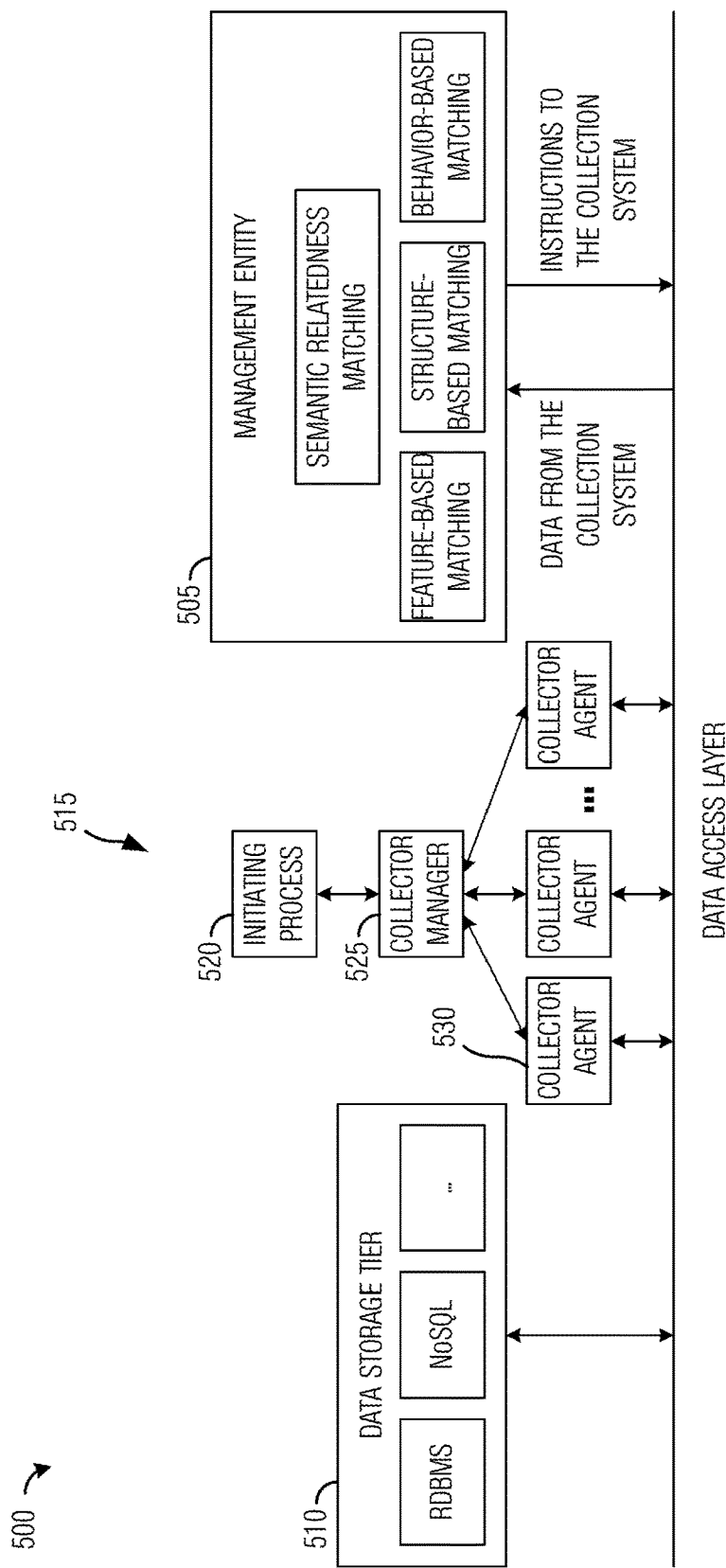
FIG. 5 illustrates a detailed view of components of an example management system according to example embodiments described herein.

FIG. 5 illustrates a detailed view of components of an example management system 500. As shown in FIG. 5, management system 500 includes a management entity 505, a data storage tier 510, and a detailed view of a data collection system 515. Management system 500 includes a plurality of class identification units that identify classes of objects, e.g., a ManageableEntity, using a variety of matching techniques, including feature-based matching, structure-based matching, behavior-based matching, semantic relatedness matching, and the like. Data storage tier 510 may provide storage and/or management for the collected data. Examples of collected data storage management include a relational database management system (RDBMS), not only structured query language (NoSQL), and the like.

Data collection system 515 may include an initiating process 520 that controls the collection of the data, including starting and/or stopping the collection of the data. Also included may be a collector manager 525 that is responsible for collecting the data provided by a plurality of collector agents (such as collector agent 530). Since the data provided by the plurality of collector agents may be fragmented, out of order, lost, and the like, collector manager 525 may unfragment (or equivalently, defragment), reorder, correct, and/or recover the collected data. The collected data may be provided to management entity 505. Data collection system 515 may receive instructions on the data to be collected from management entity 505.

The data collected, i.e., the data collected from the ManageableEntity or set of ManageableEntities, may be used to discover if new capabilities have been added to an existing ManageableEntity (e.g., a new card was added having additional ports), or if new ManageableEntities have been added to the communications system (e.g., a new Virtual LAN (VLAN) was created). These two examples correspond to the management system 500 being able to detect the addition of new physical and logical (or virtual) capabilities of the system being managed. Similarly, data collection may be used to discover if existing ManageableEntities and/or their capabilities have been removed from the system or are no longer functioning properly. The data collected may also be used for collecting metrics usable in calculating and/or estimating a performance level of a ManageableEntity. The metrics may also be used to generate alarms and/or faults, optimize the performance of the ManageableEntity, perform maintenance operations, execute additional management operations, and the like. These operations, commonly referred to as operational and/or management operations, may be more complex since different types of ManageableEntities have different types of characteristics and behavior. Furthermore, a single instance of a ManageableEntity may exhibit different behavior in different contexts. Therefore, a robust mechanism may be needed to relate the impact of a context on the collection of the data.

Data collection may also be used to query existing parent and/or child nodes to determine additional information about each node. Generally, given a set of known ManageableEntities (referred to herein as parent nodes), each parent node may have a set of child ManageableEntities (e.g., ports of a ManageableEntity, or services of an application). As an example, the type of node will often determine the type(s) of ManageableEntity that may be related to that node, as well as protocol, media layer, and other physical and/or logical characteristics that form semantics of those relationships. Examples include port bonding and link aggregation (which are a function of the type of port, type of media, and the type of protocol being used). Different types of VLANs and Virtual Private Networks (VPNs) have similar semantics. Similarly, services may also be found from parent nodes and/or child nodes using several different protocols (e.g., simple service discovery protocol (SSDP), service location protocol (SLP), universal plug and play (UPnP), and the like). These protocols have different applications, and hence different semantics. Hence, the information model provides a single source for representing different types of ManageableEntities, and their relationships, using a common set of model elements with a common set of semantics.

Usually, data collected from ManageableEntities attached to one or more communications systems will be intermingled, making it difficult to associate data with a specific ManageableEntity to which it belongs. This may be exacerbated by change, e.g., ManageableEntities can join or leave communications systems without the management system being informed. Furthermore, ManageableEntities may be changed. As an example, the configuration of a ManageableEntity's configuration may be changed, which alters the functionality that the ManageableEntity provides. The information model of the communications system provides the knowledge needed to recognize one or more capabilities of a ManageableEntity or a set of ManageableEntities. Management of heterogeneous entities may therefore be normalized by matching common aspects of different capabilities of each of the different ManageableEntities. Once a set of common capabilities is determined, further processing may continue (if needed) across applicable sets of ManageableEntities.

An information model may be used to optimize the data collection process or set of processes for obtaining data from all or a subset of ManageableEntities. The optimization may be based on optimization factors, including the nature of the data to be collected, the type of ManageableEntities involved, the type of protocols that are used, the context of the communications system, needs of users and/or applications of the collected data, and the like. Optimizations may include determining which users and/or applications need the same data and optimizing the collection of the data so that the data is queried as few times as possible; use the same protocol and optimizing the collection of the data so that the number of protocol connections is minimized; and use the same commands (e.g., vendor-specific CLI, vendor neutral scripting languages, and the like) to query different attributes of the same or different ManageableEntities and optimizing the collection of the data (optionally with different attributes being filtered differently).

The behavior of a ManageableEntity A may be defined as a set of intrinsic attributes and/or relationships that involve ManageableEntity A, and/or a set of extrinsic classes, attributes, and/or relationships between the ManageableEntity A and a set of model elements that represent one or more ManageableEntities $B_1 \ldots B_n$. It is noted that the definition also holds when the single ManageableEntity A is replaced with a set of ManageableEntities $A_1 \ldots A_m$. The use of an information model may enable behavior to be statically defined and managed through a set of mechanisms that are themselves expressed in the information model (e.g., by using a dedicated set of model elements) such as policy rules and/or state automata. It may also be possible to dynamically define behavior, as well as enable changes in behavior.

The use of the information model may allow the management entity to be independent of technology-specific implementation. This is applicable to the protocols used as well as the type of data to be collected, the type of ManageableEntity that is the target for the data collection operations (e.g., storage device vs. network device vs. server vs. application), how that data is collected, the type of pre- and post-processing done on the collected data, the type of storage used for the collected data, how the ManageableEntities themselves are represented, and the like. Furthermore, the management entity is independent of data collection mechanism, e.g., collection agents, agentless collection, or a combination thereof.

Overview of Metadata Enhanced Model-based Inventory Management Process

Figure 6:
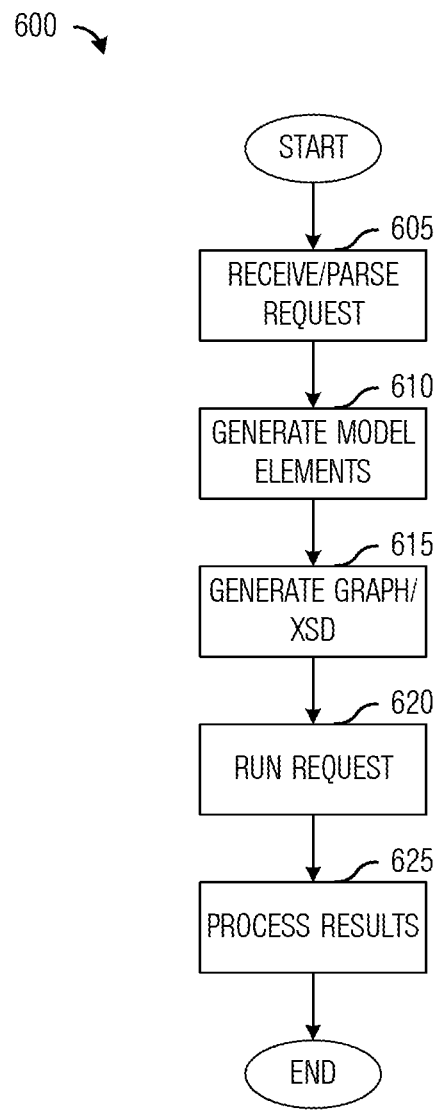
FIG. 6 illustrates an example flow diagram of high-level operations occurring in a management entity as the management entity directs the collection of data for one or more entities in a communications system according to example embodiments described herein.

FIG. 6 illustrates a flow diagram of high-level operations 600 occurring in a management entity as the management entity directs the collection of data for one or more entities in a communications system. Operations 600 may be indicative of operations occurring in a management entity, such as management entity 315, management entity 405, and management entity 505, as the management entity directs the collection of data, such as inventory data, for one or more entities, e.g., ManageableEntity or ManageableEntities, in a communications system.

Operations 600 may begin with the management entity receiving a request to collect inventory data (block 605). The request may be in the form of input from a user of the management entity, an application executing in the management entity or another management entity, an external management entity, another instantiation of the management entity (such as in a distributed inventory management system), and the like.

According to an example embodiment, the request comprises a mandatory portion and an optional portion. The mandatory portion may be used by a user to specify the information to be searched for per the request, while the optional portion may be used by the user to define any particular metadata that the user wishes to provide. The metadata may be descriptive and/or prescriptive in nature.

The management entity may also parse the request (block 605). Parsing the request may include ensuring the validity of the request, detecting errors in the request, and the like. Parsing the request may also include morphological and lexical preprocessing. The morphological and lexical preprocessing may help simplify subsequent parsing and decision-making operations. As an example, by performing morphological normalization operations, a single canonical word form may be used to group words that appear different into the same morphological family. As yet another example, morphological and lexical preprocessing may identify additional dependencies between elements of the request (e.g., the protocol being used and the data being collected) that were not explicitly mentioned as part of the request. Parsing the request may also include the production of part of speech (PoS) tokens, which are used to help guide further processing.

The management entity may generate one or more model elements (block 610). The generation of model elements may include extraction of context tokens and content tokens from the parsed request. The context tokens collectively represent both extrinsic metadata that are known by the user and/or the management entity as well as intrinsic metadata that only the management entity knows about. The content tokens include information that the user wants to retrieve translated into a form that permits ready definition of dependencies between different components. Additionally, the context tokens and the content tokens may be mapped into the model elements.

The management entity may generate a graph and/or an extensible markup language (XML) schema definition (XSD) (block 615). The generation of graphs and/or XSDs may include a combination of sets of graphs arising from the mapping process of content tokens to model elements into a single graph and subsequently optimizing the graph. The optimized graph may be converted into XSDs, which describe the results of the query into a platform neutral format.

The management entity may execute the operation(s) required to collect and analyze data using one or more XSDs (block 620). The XSD(s) guide the collection and analysis of data, which may be organized and inventoried by the management system. The management entity may process results from the XSDs, i.e., the data (block 625). The management entity may process the results into a form that can be displayed to the user, for example.

Figure 7:
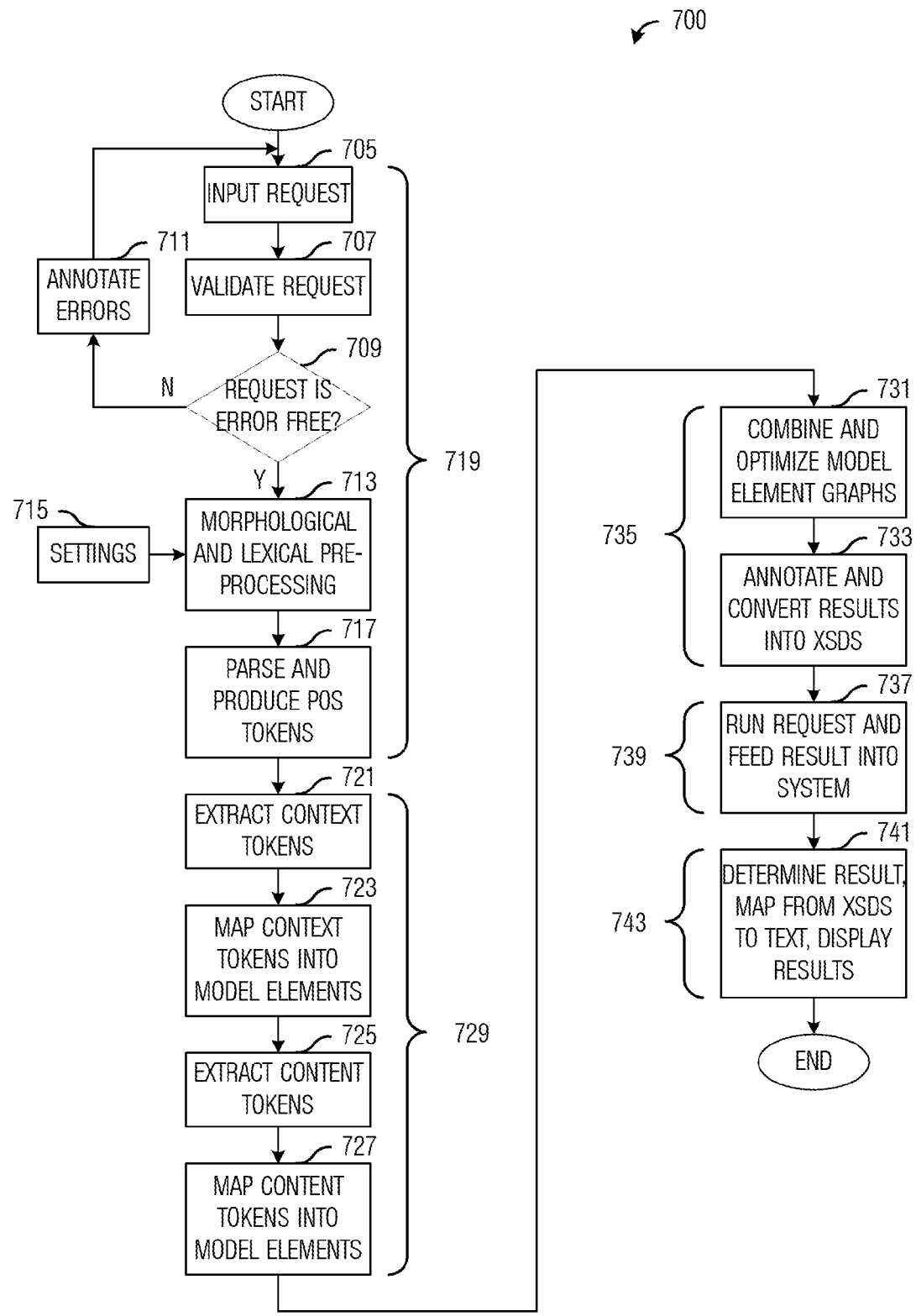
FIG. 7 illustrates an example flow diagram of operations occurring in a management entity as the management entity directs the collection and processing of data for one or more entities in a communications system according to example embodiments described herein.

FIG. 7 illustrates a flow diagram of operations 700 occurring in a management entity as the management entity directs the collection and processing of data for one or more entities in a communications system. Operations 700 may be indicative of a detailed view of operations occurring in a management entity, such as management entity 315, management entity 405, and management entity 505, as the management entity directs the collection of data, such as inventory data, for one or more entities, e.g., ManageableEntity or ManageableEntities, in a communications system.

Operations 700 may begin with the management entity receiving a request to collect inventory data (block 705). The request may consist of a mandatory portion and an optional portion. The mandatory portion may include user provided specifics about information that the management entity is to inventory, while the optional portion may include user provided or user defined metadata. The user defined metadata may be descriptive and/or prescriptive in nature. It is noted that the request may be in the form of direct input from a human, input from an application or system, another management entity, and the like. For discussion purposes, it is assumed that the management entity is interacting with a human user. However, the focus on human users should not be construed as being limiting to either the scope or the spirit of the example embodiments. Furthermore, to help eliminate confusion, a request may be used to refer to the mandatory portion, the optional portion, or both the mandatory portion and the optional portion.

According to an example embodiment, the request may be provided to the management entity in the form of a mandatory portion (as a mandatory query string, for example) and an optional portion (as an optional query string, for example). The mandatory query string may be referred to as a mandatory query and the optional query string may be considered to be an optional query. There may be no restrictions on the entering of the two query strings. As an illustrative example, a restriction may be to limit the user by forcing the user to choose between pre-populated radio buttons, list boxes, combo boxes, and the like. A less restrictive example would allow the user to enter the two query strings freestyle.

If the optional query is present, a special tag may be added to it. The request (the mandatory query and possibly the optional query) may be validated (block 707). If both queries are present, the mandatory query and the optional query may be considered to be separate queries at this point since the optional query has not been integrated with the mandatory query. If there is no optional query, the mandatory query is validated alone.

The validation may determine which dependencies are present in the request. In general, there may be several different types of dependencies, including the type of data to collect, the type of protocols used to collect each type of data, the types of pre and/or post processing operations to be performed on each type of data, and the types of storage operations to be performed on each type of data. The validation may result in a tuple that defines the dependencies between the data requested, protocols to be used, operations to pre and/or post process the data, and storage of the data before and/or after it is collected. In other words, a full set of dependencies that exists for the request is produced.

Figure 8:
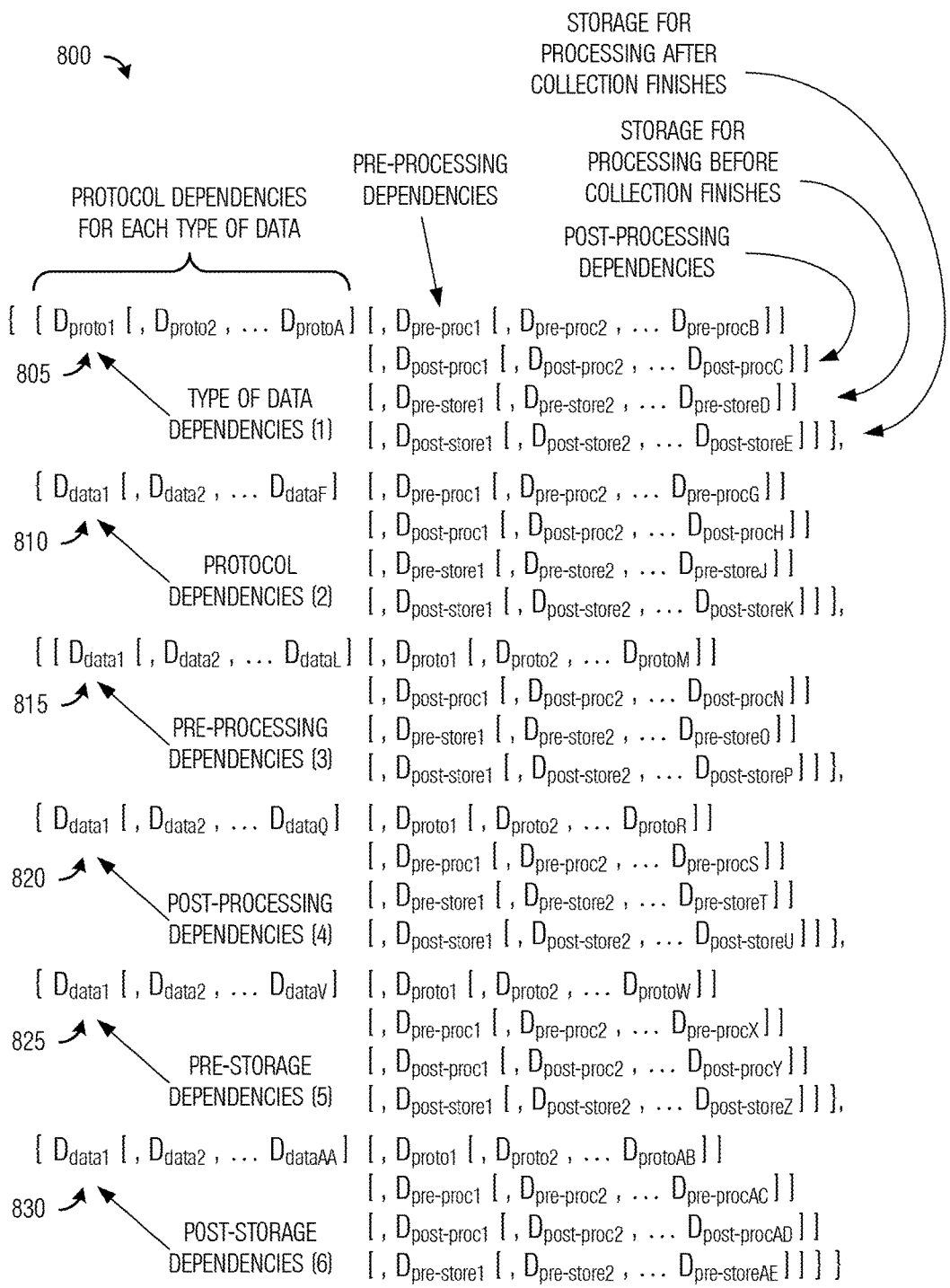
FIG. 8 illustrates an example tuple defining dependencies among data and their processing according to example embodiments described herein.

FIG. 8 illustrates a tuple 800 defining dependencies among data and their processing. Tuple 800 may be an example of the output of parsing the request to form the dependency list (block 610, FIG. 6). According to an example embodiment, tuple 800 defines dependencies between the data requested, the protocols to be used, the operations to be used to pre-process and/or post-process the data, and storage of the data before or after it is sent. A first line 805 (i.e., the first group of four statements) represents the dependencies between the type of data to be collected and the protocol(s) to be used. Since the dependencies are from the type of data to the set of protocols, the subscripting shows just the protocols. Furthermore, only the first protocol is mandatory, since it is required to use a protocol to retrieve data of any type. The rest of the first line is optional, and can be simplified as:

$$\{ \{ D_{proto1} [, D_{proto2}, \ldots D_{protoA} ] \\ [\text{ optional pre-processing }] \\ [\text{ optional post-processing }] \\ [\text{ optional pre-storage }] \\ [\text{ optional post-storage}] \}, \ldots$$

The second set of four statements (second line 810) is similar, defining the protocol dependencies, first for data, then for pre-processing, post-processing, pre-storage, and then post-storage. Similarly, lines 3 through 6 do the same for pre-processing, then post-processing, then pre-storage, then post-storage. It is noted that the notation [ . . . ] indicates that text within the brackets is optional.

Second line 810 defines the dependencies between the protocol(s) used and the type(s) of data being collected, the pre-processing method(s) used, the post-processing method(s) used, and any associated storage requirements. The difference between this line and the first line is that the first line describes the dependency from the point of view of the data, whereas this line describes the dependency from the point of view of the protocol. This is an asymmetric relationship; hence, each dependency may be different. It is noted that the dependencies are optional.

Third line 815 defines the dependencies between the pre-processing method(s) used and the type(s) of data being collected, the protocol(s) being used by each method, the post-processing method(s) used, and any associated storage requirements. It is noted that the dependencies are optional.

Fourth line 820 defines the dependencies between the post-processing method(s) used and the type(s) of data being collected, the protocol(s) being used by each method, the pre-processing method(s) used, and any associated storage requirements. It is noted that the dependencies are optional.

Fifth line 825 defines the dependencies between the "pre-storage" method(s) used and the type(s) of data being collected, the protocol(s) being used by each method, the pre- and post-processing method(s) used, and any associated post-storage requirement. Here, the term "pre-storage" means that temporary storage is required during the data collection process. It is noted that the dependencies are optional.

Sixth line 830 defines the dependencies between the "post-storage" method(s) used and the type(s) of data being collected, the protocol(s) being used by each method, the pre- and post-processing method(s) used, and any associated pre-storage requirement. Here, the term "post-storage" means that temporary and/or permanent storage is required after the data collection processing operation has finished. It is noted that the dependencies are optional.

Referring back to FIG. 7, the management entity may perform a check to determine if the request is error free (block 709). If the request is not error free, the management entity may annotate the error(s) in the request (block 711) and return to block 705 to receive another request. In general, the check to determine if the request is error free may be a link to future actions, such as automated actions. However, since not all things can be automated, there may be a need for human intervention.

If the request is error free, the management entity may perform morphological and/or lexical pre-processing operations on the query (block 713). The morphological and/or lexical pre-processing operations may simplify parsing of the query in subsequent operations. As an illustrative example, the management entity may perform morphological normalization operations, such as stemming and/or lemmatization, to group words that appear different into the same morphological family using a single canonical word form. In practice, stemming removes the ending of the word form, thereby removing any inflectional and/or derivational morphemes, leaving a root morpheme.

However, since some words are homographs (words that have the same spelling but have different meanings, such as the many possible forms and meanings of the words saw, bass, and the like), simple stemming may not be sufficient. In such situations, grammatical categorization of the word may also be required. Lemmatization provides the grammatical categorization by mapping word forms to their lemma (or base) form. Typically, lemmatization is combined with part-of-speech tagging to disambiguate hard cases and may be performed as part of a parsing operation to produce part of speech (PoS) tokens (block 717).

Lexical analysis work on the structure of words by examining the set of morphemes that make up a word and comparing the word to its part-of-speech and other data. Lexical analysis may further take or more actions based upon stored rules. Lexical analysis may account for spelling mistakes as well as provide other uses. Both block 713 (morphological and lexical pre-processing) and block 717 (parsing and producing PoS tokens) may be made user-configurable through one or more settings (block 715).

The parsing and producing of PoS tokens (block 717) may make use of any one of the commonly available parsing algorithms to parse the request to collect information, as long as the parsing algorithm used is capable of producing the set of PoS tokens mapping the textual representation of the request to the set of tokens with each token taking on a single part-of-speech as defined by an associated tag set. Furthermore, any PoS tagger may be used. As an illustrative example, a tagger that can provide detailed tags (such as one capable of differentiating between singular nouns, plural nouns, singular proper nouns, and the like).

In an embodiment, parsing the request to collect the data includes performing morphological pre-processing on the request to produce a first request, performing lexical pre-processing on the first request to produce a second request, combining the results of the first and second requests to produce a third request, parsing the third request to produce the parsed request, and generating part-of-speech tokens from the parsed request. In another embodiment, parsing the request to collect the data includes performing lexical pre-processing on the request to produce a third request, parsing the third request to produce the parsed request, and generating part-of-speech tokens form the parsed request.

Collectively, blocks 705-717 may be referred to as receiving and/or parsing a request (blocks 719) and may be an implementation of block 605 of FIG. 6.

The management entity may extract context tokens from the parsed request (block 721). In general, the context tokens represent both the extrinsic metadata that the user and/or the management entity know about and the intrinsic metadata that the management entity knows about (or can find from managed elements of the managed system). According to an example embodiment, an information model utilizing the capabilities of DEN-ng is used. Such an information model may have an integrated metadata class hierarchy as part of its model, and the metadata class hierarchy may be seamlessly integrated with a main class hierarchy that represents the managed objects of the managed system.

Figure 9:
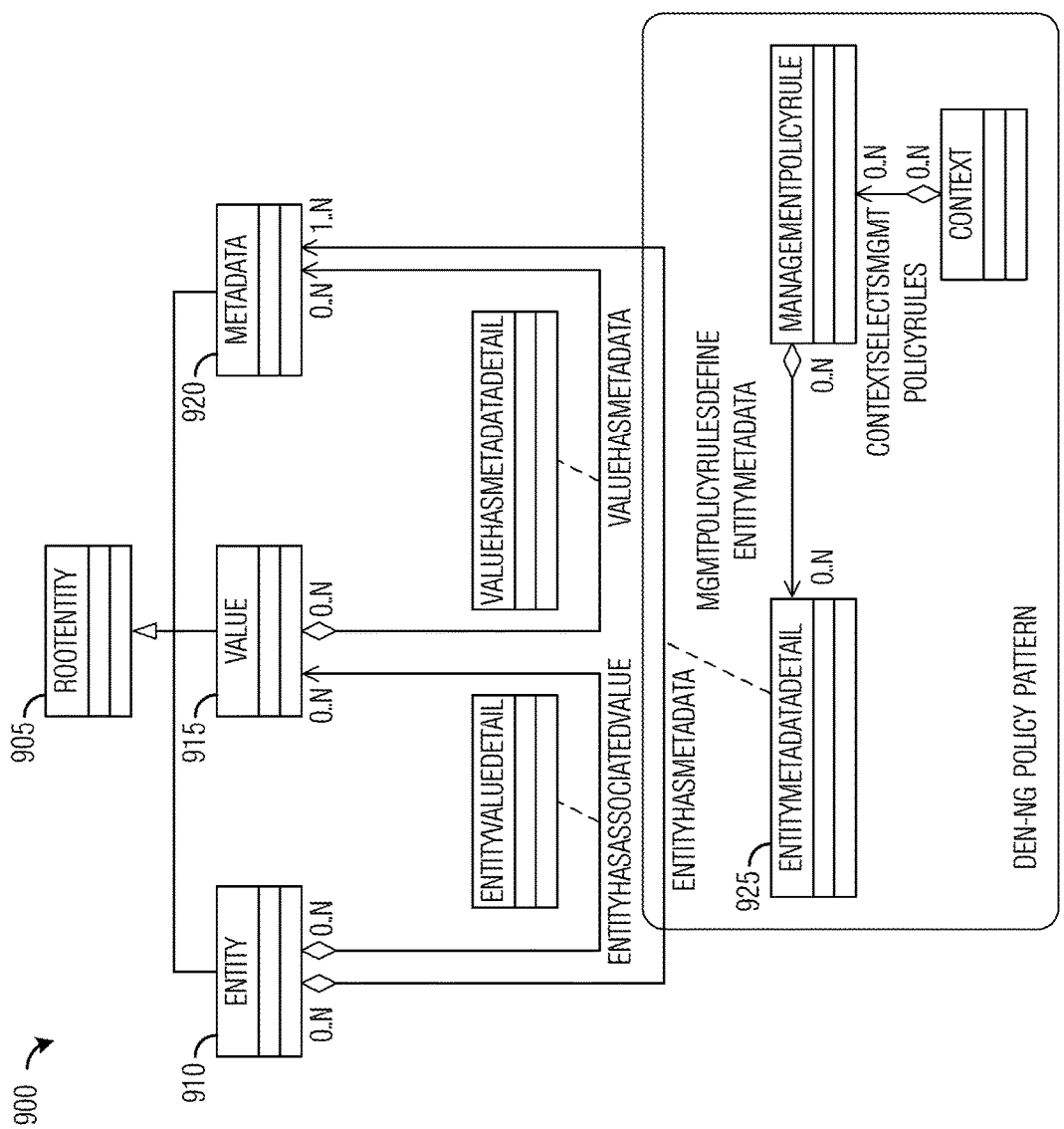
FIG. 9 illustrates an example class hierarchy according to example embodiments described herein.

FIG. 9 illustrates a class hierarchy 900. Class hierarchy 900 is a DEN-ng class hierarchy. A RootEntity 905 may be at the top of class hierarchy 900. Attributes of RootEntity 905 may enable the naming, describing, and identifying of all objects (including manageable and unmanageable objects) in the environment. In general, an Entity 910 is an abstract class that extends the (abstract) RootEntity class 905 in order to represent classes of objects that are important to the environment being managed. Entity 910 may represent objects that have separate and distinct existence, differentiating it from the (abstract) Value class 915, which may represent objects that are simply collections of attributes or abstractions of behavior without having a separate existence. Subclasses of Entity 910 may play one or more business functions, as well as represent characteristics and/or behaviors of the entities in the environment. Entities may be either managed (e.g., a network device) or unmanaged (e.g., a chassis).

Metadata 920 may be an abstract class, defining information that describes or prescribes the state of Entity 910 or Value 915 that Metadata 920 is applied to. Classification theory may be used to ensure that entities and values only contain characteristics and behaviors required to define Entity 910 or Value 915. Other descriptive and/or prescriptive data are described in metadata attached to respective entities and values. In DEN-ng designs, metadata is used to implement metadata driven designs that enable behavior to be dynamically added at runtime without having to change or edit code of the management system.

In reference to class hierarchy 900, any entity may have associated metadata. EntityMetadataDetail association class 925 may enable policy rules to be used to govern which types of metadata can be associated with which types of entities. In particular, a role may be a subclass of metadata. Therefore, EntityHasMetadata aggregation, along with EntityMetadataDetail association class 925, may be used to define which roles a particular entity is allowed to take on for a given context. This is accomplished using the DEN-ng Policy Pattern to automate the application of policy rules to change behavior using an appropriate set of metadata subclasses to define the metadata required to specify the desired behavior with an appropriate subset of context subclasses to control which set of policy rules are active at what time.

EntityMetadataDetail association class 925 may be a mandatory abstract association class and defines the semantics of the EntityHasMetadata aggregation. EntityMetadataDetail association class 925 contains attributes and relationships that are common to specifying how entities and metadata are associated with each other. Since there are different types of entities and different types of metadata that can be associated with each entity, EntityMetadataDetail association class 925 is abstract to enable the Type Object pattern to be used to build an appropriate set of concrete subclasses to model the different semantics that could exist between different entities and different metadata. As an illustrative example, while all entities have metadata that defines their version history, different organizations in an enterprise may define versioning information differently. In such a situation, different concrete subclasses of this association class may be defined to reflect the different versioning requirements of each organization in a data model by using the Type Object pattern. Since each concrete subclass inherits the set of common attributes and relationships defined in the association class, the definition of which types of metadata may be associated with which types of entities can be assigned and managed in a common way; any differences that are needed may be reflected in concrete subclasses of the association class. The DEN-ng Policy Pattern is used to enable context-aware policy rules to be used to appropriately constrain or change the information provided by metadata for a given entity when that entity is in a specific context. This is fundamental to enabling behavior to adapt to changing context.

According to an example embodiment, metadata may be used to set a context in which to evaluate both the content of a request, as well as a degree of relationship present between the dependencies in the request, i.e., the data requested, the protocols to be used, the operations to be used to pre-process and/or post-process the data, and storage of the data before or after it is sent. In other words, setting the context may help to evaluate the content by ensuring that the semantics of the request are being defined and correctly taken into account. Setting the context may also help measure the strength of each dependency by providing additional data for measuring how that particular dependency affects the request.

Figure 10:
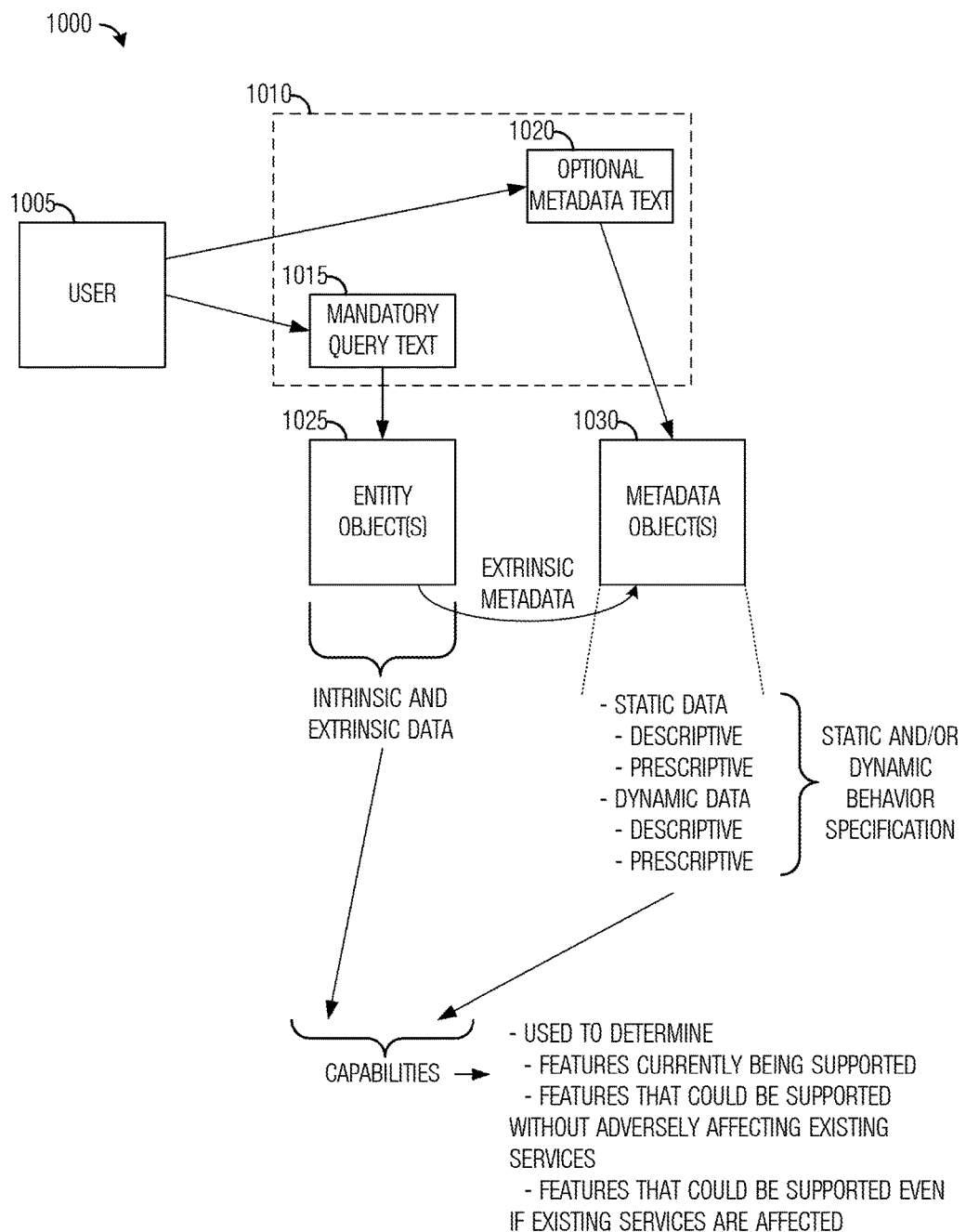
FIG. 10 illustrates an example diagram of the use of metadata to set a context according to example embodiments described herein.

FIG. 10 illustrates a diagram 1000 of the use of metadata to set a context. As shown in FIG. 10, a user 1005 enters a request 1010 to a management entity. Request 1010 may include mandatory query text 1015 (previously referred to as a mandatory portion) as well as an optional metadata text 1020 (previously referred to as an optional portion). The management entity may parse request 1010 to determine entity object(s) 1025 and metadata object(s) 1030, with entity object(s) 1025 providing extrinsic metadata for metadata object(s) 1030. Entity objects 1025 may include intrinsic data and/or extrinsic data, while metadata object(s) 1030 may provide static and/or dynamic behavior specifications. Together, entity object(s) 1025 and metadata object(s) 1030 may be used to specify capabilities of managed entities. As an example, entity object(s) 1025 and metadata object(s) 1030 may be used to determine features currently supported, features that may be supported without adversely affecting existing services, features that may be supported even if existing services are affected, and the like.

Referring back to FIG. 7, the management entity may map the context tokens to a first set of model elements (block 723). The mapping of the context tokens to the first set of model elements produces a graph or a multigraph of the model elements. The management entity may extract content tokens from the parsed request (block 725). In effect, the content of the parsed request is represented in token form. The content tokens may be representative of the set of information that the user wishes to retrieve, but translated into a form that enables the management entity to readily define dependencies that exist between the different components of the collection of the information. The management entity may map the content tokens into a second set of model elements (block 727). The mapping of the content tokens into the second set of model elements may be similar to the mapping of the context tokens into the first set of model elements except that the mapping is performed using the content instead of the context. In general, the context may define choices and/or constrain the functionality of the managed system, such as limiting the cardinality of associations, which the information model represents, for example. In other words, the set of model elements 725 derived from the context of the query, may be used to constrain the functionality represented by the set of model elements 727 derived from the content of the query. Since the metadata may represent the descriptive and prescriptive information about the data to be collected, how the data is to be collected, and other pertinent factors about the collection process, the metadata can play an important role in the management entity in general and the collection of the data in particular. The metadata may therefore help to define the dependencies in a more precise manner.

Collectively, blocks 721-727 may be referred to as generating model elements (blocks 729) and may be an implementation of block 610 of FIG. 6.

The management entity may combine and optimize the graph or the multigraph of the second set of model elements resulting from the mapping of the content tokens to the second set of model elements (block 731). The combining of the graph or the multigraph may produce a single optimized graph (if possible). The management entity may convert the optimized graph(s) into a set of XSD documents (block 733). The set of XSD documents may describe the results of the request in a platform neutral form and provide a machine understandable, platform neutral representation of the request. Collectively, blocks 731 and 733 may be referred to as generating a graph and/or XSD (blocks 735) and may be an implementation of block 615 of FIG. 6.

The management entity may execute the request and collect live data (block 737). The collected data may be organized and/or inventoried in accordance with the XSD documents, for example. Since the organization and/or inventorying of the collected data may produce a set of XML XSD documents, the request results may be readily obtained using a variety of XML tools to answer questions and/or execute commands in the request. Block 737 may be referred to as running the request (block 739) and may be an implementation of block 620 of FIG. 6. The management entity may convert the request results into a displayable form and display them for the user (block 741). Block 743 may be referred to as processing the result (block 745) and may be an implementation of block 625 of FIG. 6.

Figure 11:
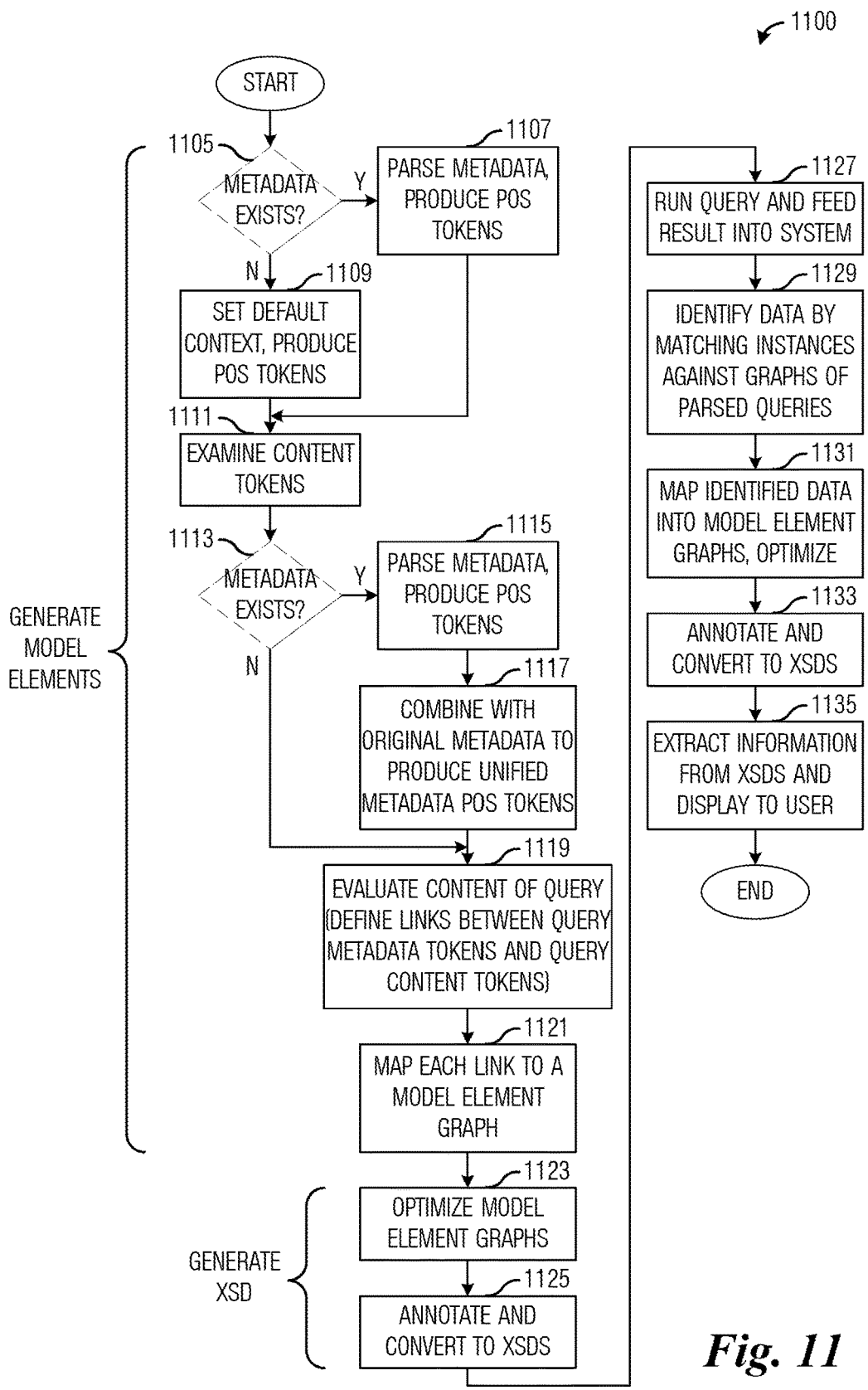
FIG. 11 illustrates an example flow diagram of operations occurring in a management entity as the management entity generates model elements and XSD documents according to example embodiments described herein.

FIG. 11 illustrates a flow diagram of operations 1100 occurring in a management entity as the management entity generates model elements and XSD documents. Operations 1100 may be indicative of a detailed view of operations occurring in a management entity, such as management entity 315, management entity 405, and management entity 505, as the management entity generates model elements and XSD documents. Operations 1100 may be an example implementation of blocks 721-741 of FIG. 7.

Operations 1100 may begin with the management entity performing a check to determine if optional metadata exists (block 1105). In other words, the management entity may perform a check to determine if the user entered optional metadata terms. If the optional metadata exists, the management entity may parse the optional metadata and generate Part of Speech (PoS) tokens for the optional metadata (block 1107). If the optional metadata does not exist, the management entity may define a default context and produce PoS tokens appropriate for the default context (block 1109).

After the PoS tokens (e.g., context PoS tokens) have been defined, the management entity may examine content tokens (block 1111). The examination of the content tokens may help ensure that, when a DEN-ng derived model (or a model that does not have the capabilities of DEN-ng) is not used, the content tokens just represent content and does not itself contain metadata. In general, many management entities do in fact embed metadata into definitions of managed objects as well as data that describe the managed objects. As an example, consider a situation where the content of the request is looking for a specific SNMP attribute. If data is retrieved using SNMP, much of the critical information that is required to understand each datum is contained in a comment attribute of the data structure of the managed object. Hence, the management entity may examine the content tokens in their PoS representation to better facilitate the determination of the presence of metadata in the content portion of the request (block 1113).

If the metadata exists, the metadata may be extracted, parsed, and additional PoS tokens may be produced by the management entity (block 1115). The additional PoS tokens may be combined with the original metadata PoS tokens (which were present in block 1111) to produce a combined and unified set of metadata PoS tokens (block 1117).

The management entity may evaluate the content of the request using the metadata PoS tokens to define links between metadata PoS tokens and content PoS tokens (block 1119). The content of the request may also be in the form of PoS tokens. The PoS tokens are used to help ensure that semantic nuances of the request may be taken into account. This includes both the wording used in the request by the user as well as inferred semantics that arise from dependencies involved in executing the request. Since both the context and the content of the request are represented by the PoS tokens, the request may be evaluated by defining links between the context PoS tokens and the content PoS tokens. The evaluation of the content of the request may help to ensure that context-aware applications can be properly instrumented. As an example, Internet of Things applications that use special sensors and actuators may provide different data and functionality based on different contexts (e.g., time of day, input, and the like). Furthermore, the metadata tokens may be used to disambiguate the content tokens. As an example, a request may use the phrase "network devices that a Gold customer uses" (where gold is one of several service levels), and describe the functionality of a "network device" in associated metadata. A model may not have a class named "network device", however, the management entity may use the metadata in combination with the information model to match this request to entities that do exist, thereby satisfying the query. In addition, this may also constrain certain choices by the management entity. For example, since the query says " . . . that a Gold customer uses", this enables the management entity to remove any network devices that are used by customers that subscribe to a different quality of service.

The management engine may map links (as defined in block 1119) to a graph of one or more model elements (block 1121). The graph of the one or more model elements may be constructed using PoS tokens to determine specific model elements that can represent the different aspects of the request, especially the semantics of the request. The relationships of the model elements may be important in the determining of the specific model elements since they connect metadata objects to entity objects. The use of the policy pattern may be able to enhance the importance of the relationships of the model elements.

The determining of the specific model elements is an illustration of the power of using contexts. As an illustrative example, depending on a particular context, attributes may take on different values, associations may be instantiated (or not instantiated), associations that are implemented as association classes may have their semantics altered significantly by having the context affect the association class, which in turn affects the attributes and relationships of the association class implementing the association, and the like.

The mapping of links to the graph of one or more model elements may produce a set of model element graphs since the request may ask for separate objects that have no relationship with one another. However, there may be underlying links that connect objects together that may not be readily evident. As an example, the user may ask for data relating to a hardware problem but the user may not realize that the hardware were all backed up by a common agent that was infected by a virus, or that some hardware was operating on an isolated network while other hardware was less protected. The management entity may optimize the model element graphs (block 1123). The optimization of the set of model element graphs may be accomplished by determining if there are additional common elements that are shared that may join individual graphs into a more complex graph structure, such as a hypergraph or a multigraph.

The management entity may annotate and convert the graph or set of graphs to a set of XSDs (block 1125). The annotation and conversion of the graph or set of graphs may help maximize platform independence. The management entity may also save the results (the XSD), to a memory, for example. The XSD may be a machine understandable version of the user's request, in the sense that it defines how the management entity can look for matching information to identify data by comparing data to model elements.

The management entity may run the query and provide results (such as a raw data stream) to a unit for processing (block 1127). The management entity may make use of previously parsed and optimized request plan and/or non-optimized versions of the request plan to help match data instances with model elements. The matching process may use any combination of associative matching, structure matching, lexical matching, or semantic relatedness matching to identify each data as a particular model element that corresponds to a set of model elements in the information. The matching process also uses identification data to identify larger sets of data, such as managed objects, properties and relationships between managed objects, and groups of managed objects. Furthermore, the matching process also continues to form larger and larger objects and aggregations of objects until no more objects can be constructed. The processing performed in block 1127 may result in the data being mapped into model element graphs (similar to block 1123); hence, it may be possible to further optimize these graphs into a smaller number of more complex graph structures (block 1131).

The management entity may annotate the results of the optimization of the graphs, as well as convert a final graph or set of graphs, into a set of XSDs (block 1133). The management entity may extract information from the set of XSDs and display the information to the user (block 1135). The information may be the result of the user's request. Annotations contained in the set of XSDs may also be displayed to the user. The annotations may contain hints, suggestions, and/or additional explanatory information for the user.

Figure 12:
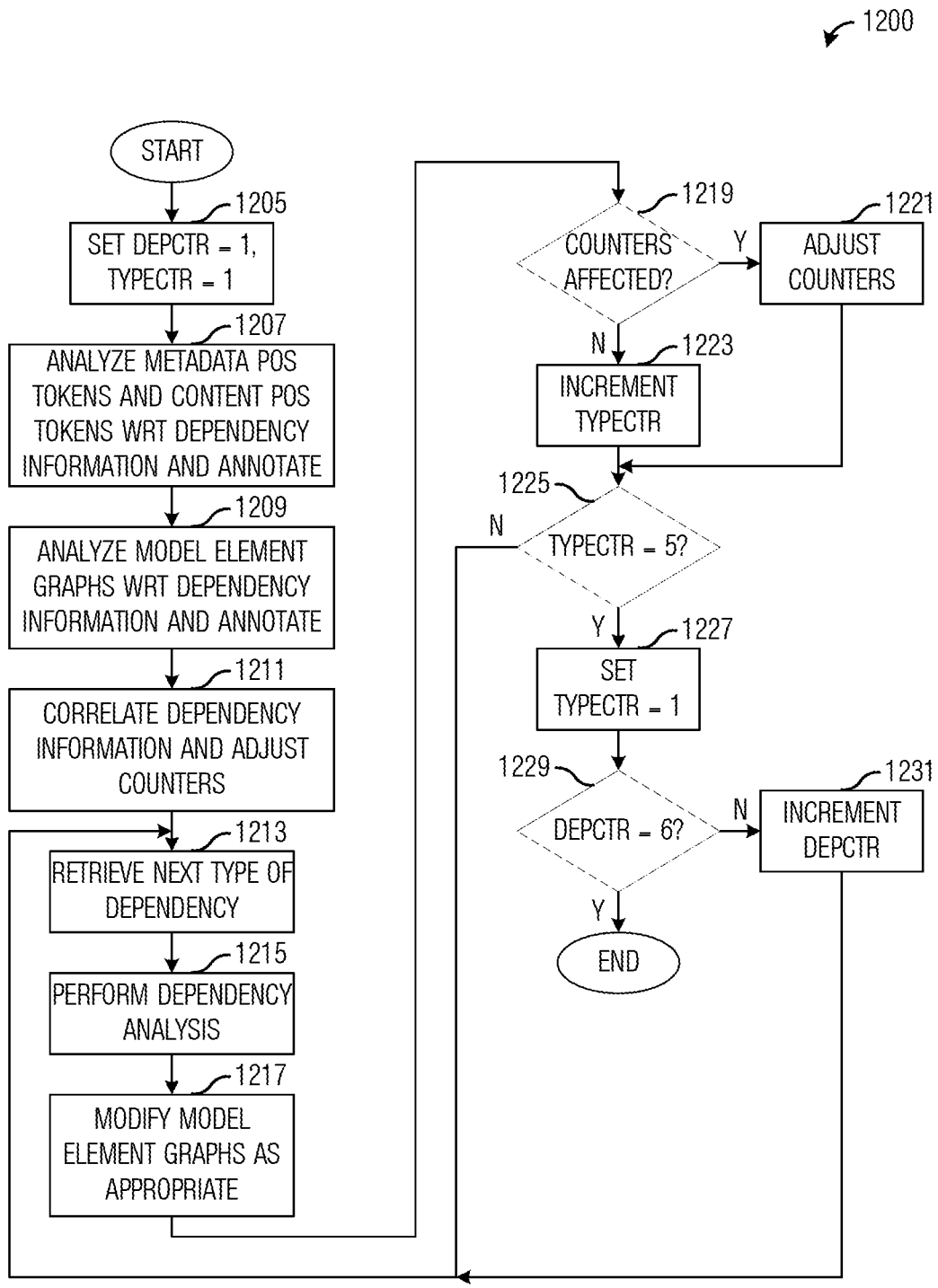
FIG. 12 illustrates an example flow diagram of operations occurring in a management entity as the management entity uses metadata to enhance the understanding of different types of dependencies that exist in the request according to example embodiments described herein.

FIG. 12 illustrates a flow diagram of operations 1200 occurring in a management entity as the management entity uses metadata to enhance the understanding of different types of dependencies that exist in the request. Operations 1200 may be indicative of operations occurring in a management entity, such as management entity 315, management entity 405, and management entity 505, as the management entity uses metadata to enhance the understanding of different types of dependencies that exist in the request for collecting data and in the set of mechanisms used to collect the data. Operations 1200 may be descriptive of events occurring between mapping links to model element graphs (block 1121) and optimizing the model element graphs (block 1123) of FIG. 11.

Operations 1200 may begin with the management entity initializing counters (block 1205). A first counter (depCtr) may be used to keep track of the number of types of dependencies, e.g., data, protocol, and the like, that have been analyzed, and a second counter (typeCtr) may be used to keep track of the number of intra-dependencies with each of the six types of dependencies that have been analyzed, e.g., how for the category 'data dependency', how many types of intra-dependencies, such as data-to-protocol, data-to-pre-processing, and the like, have been analyzed). As an illustrative example, the first counter and the second counter are both initialized to 1. For simplification purposes and without loss of generality, tuple 800 shown in FIG. 8 is used to represent the dependencies present in the data requested, the protocols to be used, the operations to be used to pre-process and/or post-process the data, and storage of the data before or after it is sent. Therefore, the maximum values for the first counter and the second counter are 6 and 5, respectively.

The management entity may analyze the metadata PoS tokens and their relationship to the content PoS tokens (block 1207). The management entity may be looking for additional information that can be applied to the type of dependencies as well as intra-dependencies within each type of dependency. As an example, if the request is entered as 'Find all instances of this SNMP attribute where . . . ', then when the management entity analyzes the PoS tokens, it knows immediately that at least one type of protocol (SNMP) is to be used. Furthermore, the management entity may parse the SNMP attribute definitions, which are in the Abstract Syntax Notation One (ASN.1) standards and are therefore machine readable, and from the SNMP attribute definition, the management entity may determine more specific information that describes the data type of the attribute, range or domain constraints, as well as other information.

According to an example embodiment, the management entity may annotate the context and the content PoS tokens with information that will permit the management entity (or users of the management entity) to understand how the dependency analysis was performed, along with any conclusions that were made. Referring back to the above presented example, the annotations may include data stating that SNMP was a required protocol due to the request expressing a need to find specific SNMP data. Additionally, the management entity may also define the data type and other information from the associated SNMP management information base (MIB) object descriptions that explain its decision for assigning the type of data that it chose to assign. An important use of the information may be to provide explanatory facilities that can be used to help verify the accuracy of the transformations performed herein, as well as provide continuing feedback to improve the transformations, e.g., via machine learning.

The management entity may analyze the model element graphs, as produced in block 1121 of FIG. 11, with respect to dependency information (block 1209). The management entity, in its analysis of the model element graphs, may look for additional information that can be applied to the type of dependencies as well as intra-dependencies within each type of dependency. As an example, if the request is entered as 'Find all problems experienced by customer X . . . ', then the management entity may search the set of model elements for references to customer X. It is noted that the search includes searching of object classes and their attributes, associations between object classes, constraints (e.g., object constraint language (OCL) expressions, and the like), and metadata. Referring back to the above presented example, suppose that the management entity found an attribute in a metadata object that was attached to an association class (which is a special type of class used to realize the semantics of an association; otherwise, an association could be realized as a simple set of points with optional navigability constraints), and that the metadata attribute contained the text string 'Currently instantiated for the following customers: X, Y, and Z'. The management entity, after parsing the text string, may recognize that this association involves customer X. The management entity may tag the association, its association class, as well as a source class and a destination class that the association connects, as model elements that should be examined in greater detail.

According to an example embodiment, the management entity may annotate model elements that had appropriate additional information relating to the content of the request that the management entity (or its users) needs to understand how the dependency analysis was performed, as well as what conclusions were made. It is noted that such an annotated model may be implemented for DEN-ng derived data models and not for DEN-ng information models since the data models are application and/or platform specific while the information models are generic. Requests, by definition, are application specific and not generic. An important use of this information may be for providing explanatory facilities that can be used to help verify the accuracy of the transformations performed, as well as provide continuing feedback to improve the transformations, e.g., via machine learning.

The management entity may correlate dependency information resulting from its analysis of the PoS tokens and the model element graphs (block 1211). The correlation may be needed due to the analysis of the PoS tokens and the model element graphs each occurring at different levels of abstraction and therefore containing different types of information. Each analysis may be used to verify and strengthen the conclusion(s) of the other. The analysis of the PoS tokens may provide detailed information about each word, phrase, as well as other sentential unit, while the analysis of the model element graphs may provide detailed information at the object level, and how the request may be realized in a system. Correlation of the information arising from the two analyses may also remove any ambiguities and enable the management entity to strengthen its conclusions by forming and verifying hypotheses concerning the translation of explicit and inferred semantics present in the request. The management system may examine the results of the correlation and adjust one or both of the counters if needed.

The management entity may initiate a dependency analysis by retrieving a next type of dependency (block 1213). It is noted that the management entity may make use of the results of block 1207, block 1209, and/or block 1213, as necessary, to determine how each type of dependency is manifested for the request.

The management entity may retrieve the next type of dependency, which for an initial iteration of the dependency analysis, may be the type of data dependency. In general, the next type of dependency consists of a mandatory dependency (e.g., at least one protocol) and four optional dependencies. Assuming that neither of the counters were updated in block 1211, both the first counter and the second counter are equal to 1. Then, when the first counter is equal to 1, the value of 1 maps to the first type of dependency and the value of the second counter (equal to 1) maps to protocol (with the other four optional dependencies being pre- and post-processing required and pre- and post-storage required). The data can be readily obtained by many different mechanisms, such as a hash table, for example.

The management entity may perform the dependency analysis for combination of the first counter=1 and the second counter=1 (block 1215). A detailed discussion of the dependency analysis is presented below. The management entity may modify the model element graphs as appropriate (block 1217). If the dependency analysis of the combination of the first counter and the second counter suggests modification of the model element graphs, the management entity may make changes to the model element graphs as needed.

The management entity may perform a check to determine if either of the counters need to changed (block 1219). As an example if the management entity has completed the dependency analysis for the combination of the first counter=1 and the second counter=1, the management entity may increment the second counter (block 1223). While if the counter(s) needs to be changed, the management entity may adjust the counter(s) (block 1221). The management entity may also perform a check to determine if it has completed the dependency analysis for the dependency (block 1225). If the management entity has completed the dependency analysis for the dependency, the management entity may reset the second counter (block 1227), and if the management entity has not completed the dependency analysis for the dependency, the management entity may return to block 1213 to perform the dependency analysis for the new combination.

The management entity may perform a check to determine if the dependency analysis has been performed for all dependencies (block 1229). If the dependency analysis has not been performed for all dependencies, the management entity may update the first counter (block 1231) and return to block 1213 to perform the dependency analysis for the new combination. If the dependency analysis has been performed for all dependencies, operations 1200 may terminate.

Figure 13:
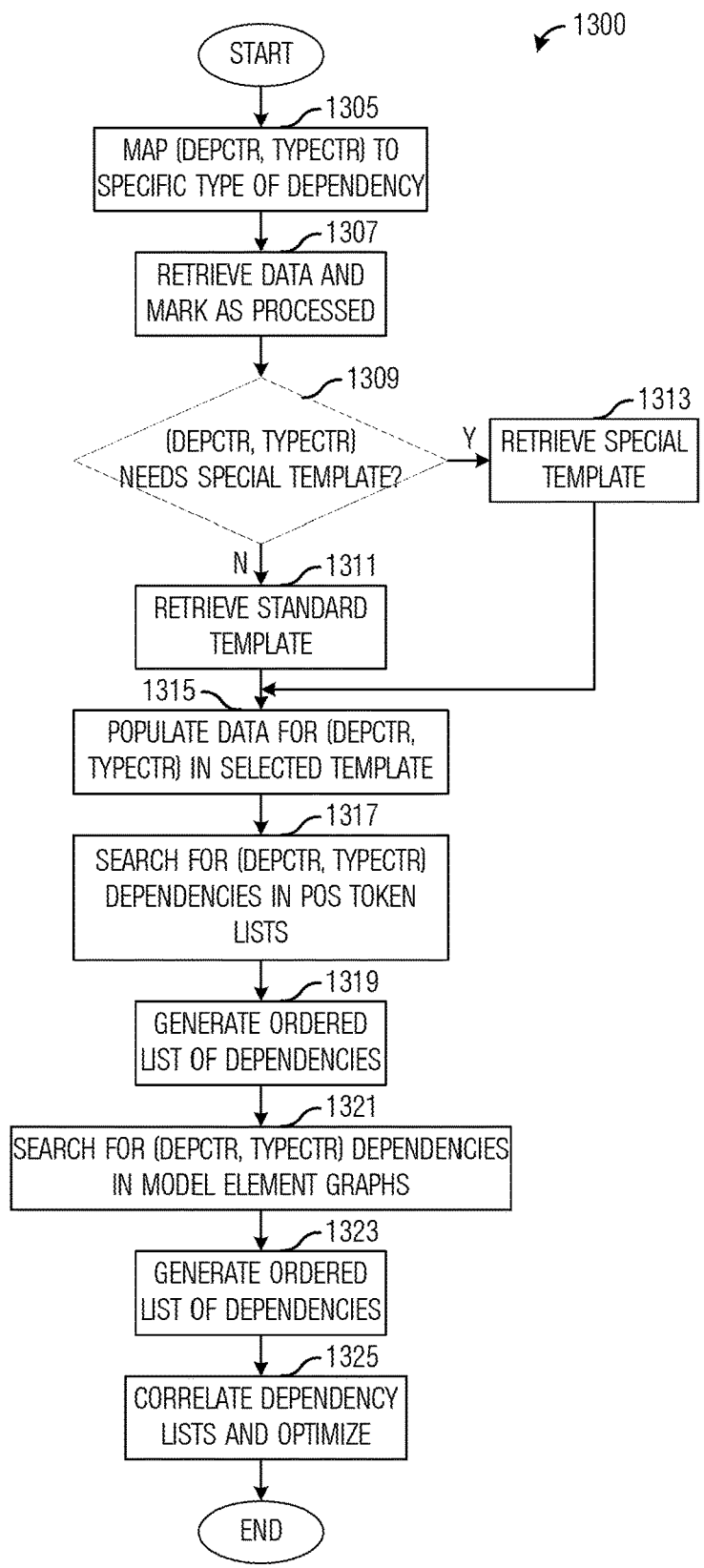
FIG. 13 illustrates an example flow diagram of operations occurring in a management entity as the management entity performs a dependency analysis for a combination of dependency and dependency type according to example embodiments described herein.

FIG. 13 illustrates a flow diagram of operations 1300 occurring in a management entity as the management entity performs a dependency analysis for a combination of dependency and dependency type. Operations 1300 may be indicative of operations occurring in a management entity, such as management entity 315, management entity 405, and management entity 505, as the management entity performs the dependency analysis for the combination of dependency and dependency type. Operations 1300 may be descriptive of events occurring between performing dependency analysis (block 1215) and modify model element graphs (block 1217) of FIG. 12.

Operations 1300 may begin with the management entity mapping a tuple (such as tuple 800) to a specific dependency (block 1305). Referring back to the above described example, on a first time through the dependency analysis loop, the tuple will be {type of data, protocol used}. As used in the discussion, 'type of data' may represent the generic category of data that is being asked for in the request (e.g., how many routers or switches are actively sending traffic, how many new devices of any type have been added since the last request was executed, and the like).

The management entity may analyze the metadata PoS tokens and their relationship with the content PoS tokens, which involves retrieving the data and marking it as processed, for example (block 1307). There may be a number of different implementation mechanisms, including retrieving the data from storage (the storage may be temporary or permanent storage) and either mark the data as processed (if the data may be needed later) or delete the data from storage (if the data is no longer needed).

The management entity may examine the type of data to be processed by evaluating a need for a template (block 1309). Since different data sources can describe the same type of data using different mechanisms (e.g., SNMP MIBs vs XML, documents vs object-oriented data model, and the like), the management entity may examine the type of data by defining a standardized but extensible data description template that normalizes the different mechanisms, thereby permitting any mechanism to be described by a common set of attributes for the purposes of performing dependency analysis. This requires the ability to understand the format in which the data is described, along with any encoded semantics (e.g., any metadata that is encoded into object attributes and not separated as a separate object, for example). This is provided by the information model. The mapping of the generic specification into an application-specific implementation is defined by one or more data models. Hence, the management entity may retrieve a data description template (either a standard template (block 1311) or a special template (block 1313)) depending of the determination made in block 1309.

While a single standard data description template based on tuple 800 as shown in FIG. 8 may be defined and used, the management entity may generalize the data description template to a set of templates to provide better flexibility in mapping generic dependencies to real world data. In general, the number of data description templates needs to be equal to the maximum number of dependencies (6 in the example discussed herein). However, it may be possible that a tuple for a specific combination of dependency and dependency type requires a specific data description template due to a sufficient number of differences. The logic provided by blocks 1309-1313 provides the operations necessary to retrieve a specific data description template.

The management entity may populate the data description template (either standard or special) with data from the content request (block 1315). The data may be the two entities that make up the type of dependency, as defined by the tuple, i.e., the (first counter, second counter) tuple. The metadata PoS tokens and the content PoS tokens may be analyzed to determine if there are any dependencies that correspond to the tuple (block 1317). Each pair of the tuple may have different dependencies. Furthermore, the dependencies are generally not symmetric, e.g., data can be related to a protocol in one way but the protocol can be related to the data in a completely different way. As an example, if the user needs to perform a special type of search and match function, such as soundex, that function may not be supported by a protocol, even though that protocol is designed for use in searching systems. In this simple example, soundex matching is very common for most database management systems and is supported by their protocols, while soundex is typically not directly supported in standard protocols used for directory servers (e.g., LDAP). It is noted however that LDAP does have the facility to do an approximate match. However, there is no guarantee that all directory servers will support such functionality. Similar situations exist with data types. Therefore, an objective of dependency processing analysis may be to find problems where the requirements for the type of data, protocol(s), pre- and/or post-processing computing functions, and pre- and/or post-processing storage functions have syntactic, semantic, and/or other types of dependencies. Table 1 provides some examples of different types of dependencies that commonly occur.

TABLE 1

Examples of Dependency Processing

| Dependency Tuple | Applied To | Dependency Examples |
|---|---|---|
| {type of data, protocol} | Searching for Objects, attributes, relationships using a specific protocol | Type of data characteristics are not suited for protocol (e.g., data requires transactional integrity, but protocol does not provide this) Data type restricts protocols that can be used Search function restricts protocols that can be used |
| {protocol, type of data} | Searching for Objects, attributes, relationships using a specific protocol | Protocol restricts the type of search operations that can be used Protocol characteristics are not suited to data characteristics (e.g., data arrival is too fast for protocol and associated processing to keep up with) |
| {type of data, pre-processing} | Applies to raw data being collected | Type of data requires special type of computational processing that is not available in the system |
| {type of data, post-processing} | Applies to processed data being collected | Type of data requires special type of computational processing that is not available in the system |
| {type of data, pre-storage} | Applies to raw data being collected that needs temporary storage | Type of data requires special type of storage (or storage characteristics) that is not offered by the system |
| {type of data, post-storage} | Applies to processed data being collected that needs temporary or permanent storage | Type of data requires special type of storage (or storage characteristics) that is not offered by the system |

The management entity may generate an ordered list of dependencies to maintain the dependencies found in the search of the metadata PoS tokens and the content PoS tokens (block 1319). It is generally considered that there are no duplicates in the ordered list of dependencies. The management entity may analyze the set of model element graphs to determine if there are any dependencies that correspond to the tuple (block 1321). The management entity may generate an ordered list of dependencies to maintain the dependencies found in the search of the set of model element graphs (block 1323). If there were no dependencies found in the search of the set of model element graphs, the ordered list of dependencies may be an empty list. Again, it is generally considered that there are no duplicates in the ordered list of dependencies. The management entity may correlate the two ordered list of dependencies as well as optimize them (block 1325). The correlation and optimization of the two ordered list of dependencies may produce a single list of dependencies. Operations 1300 may then terminate.

Figure 14:
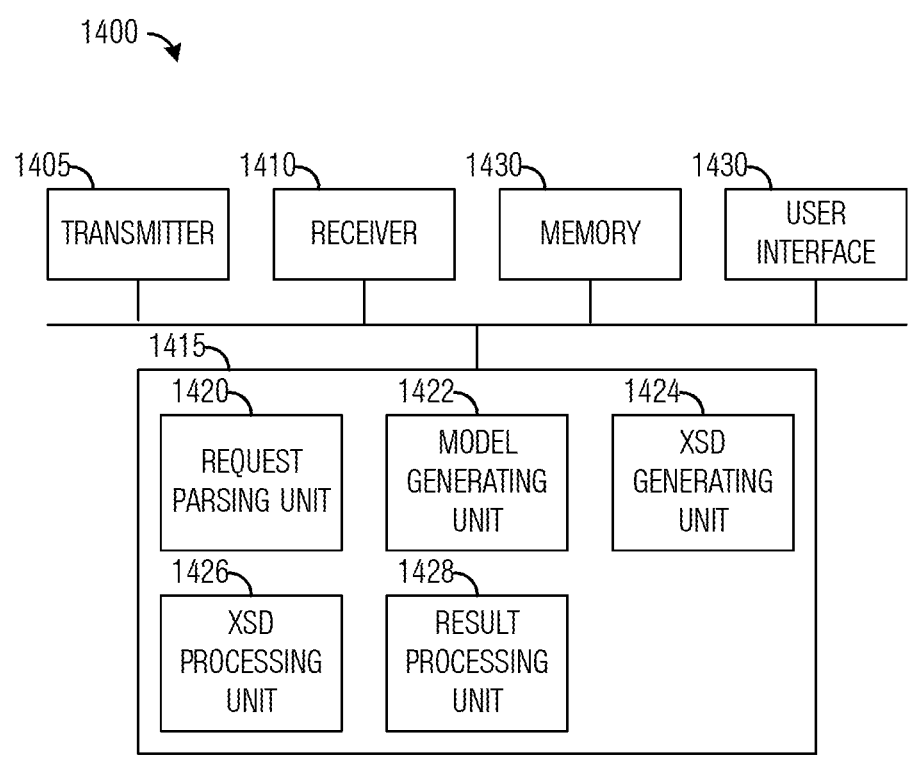
FIG. 14 provides an example device according to example embodiments described herein.

FIG. 14 provides an illustration of a device 1400. Device 1400 may be an implementation of a management entity and the like. Device 1400 may be used to implement various ones of the embodiments discussed herein. As shown in FIG. 14, a transmitter 1405 is configured to send packets, frames, requests, and/or other types of data and commands and a receiver 1410 is configured to receive packets, frames, requests, and/or other types of data. In both cases, the data may include operational, administrative, management, and/or performance data and commands. Transmitter 1405 and receiver 1410 may have a wireless interface, a wireline interface, or a combination thereof.

A request parsing unit 1420 is configured to receive a request from a user of device 1400. Request parsing unit 1420 is configured to parse the request, which may include ensuring the validity of the request, detecting errors in the request, and the like. Parsing the request may also include morphological and lexical preprocessing. The morphological and lexical preprocessing may help simplify subsequent parsing operations. Parsing the request may also include the production of part of speech (PoS) tokens. A model generating unit 1422 is configured to generate model elements. Model generating unit 1422 is configured to extract context tokens and content tokens from the parsed request. Model generating unit 1422 is configured to map the context tokens and the content tokens into the model elements.

An XSD generating unit 1424 is configured to generate a graph and/or an XSD. The generation of graphs and/or XSDs may include a combination of sets of graphs arising from the mapping process of content tokens to model elements into a single graph and subsequently optimizing the graph. The optimized graph may be converted into XSDs, which describe the results of the query into a platform neutral format. An XSD processing unit 1426 is configured to execute the XSD. XSD processing unit 1426 is configured to execute the XSD and collect the data. A result processing unit 1428 is configured to process the results into a form that can be displayed to the user or stored for subsequent review. Result processing unit 1428 is configured to organize and inventory the data.

A memory 1430 is configured to store the information model, the data model(s), the metadata, the PoS tokens, the XSDs, the model elements, the request, the pre-processing, the post-processing, the pre-storage, and the post-storage, the collected data, the transformation, the transformed data, schemas, and the like. Memory 1430 may be a physical memory, such as a disk drive, solid state memory, or a combination of the two. Memory 1430 may be physically a part of device 1400, it may be remotely located, or a combination of the two. Memory 1430 may also consist of physical memory that is virtualized, thereby enabling multiple physical memory elements to be treated as a single pool of memory that can be allocated on an as-needed basis. A user interface 1435 includes hardware and/or software to permit user interaction with device 1400. As an example, user interface 1435 includes a display, a keyboard, a touch pad, a voice recognition system, a speaker, a mouse, a stylus, and the like, to allow the user to interact with device 1400.

The elements of device 1400 may be implemented as specific hardware logic blocks. In an alternative, the elements of device 1400 may be implemented as software executing in a processor, controller, application specific integrated circuit, or so on. In yet another alternative, the elements of communications device 1400 may be implemented as a combination of software and/or hardware.

As an example, transmitter 1405 and receiver 1410 may be implemented as a specific hardware block, while request processing unit 1420, model generating unit 1422, XSD generating unit 1424, XSD processing unit 1426, and result processing unit 1428 may be software modules executing in a processor 1415, a microprocessor, a custom circuit, or a custom compiled logic array of a field programmable logic array. It is noted that processor 1415, the microprocessor, the custom circuit, the custom compiled logic array, and the like, may be implemented in a multiple processing unit configuration that may be local to one another or distributed and coupled through a communications network. Request processing unit 1420, model generating unit 1422, XSD generating unit 1424, XSD processing unit 1426, and result processing unit 1428 may be stored as modules in memory 1430.

Although the present disclosure and its advantages have been described in detail, it should be understood that various changes, substitutions and alterations can be made herein without departing from the spirit and scope of the disclosure as defined by the appended claims.

What is claimed is:

1. A method for management entity operations, the method comprising:
    parsing, by a management entity, a request to collect data about a communications system for an entity in the communications system, the parsing to produce a parsed request and dependency information related to the request;
    generating, by the management entity, sets of model elements in accordance with context tokens and content tokens derived from the parsed request, the content tokens including extrinsic metadata and intrinsic metadata of the parsed request, the generating the sets of model elements comprising:
        evaluating content of the request to collect the data to produce links between the context tokens and the content tokens; and
        mapping the links into a model element graph;
    analyzing context metadata tokens and content metadata tokens in accordance with the dependency information;
    analyzing the model element graph in accordance with the dependency information;
    modifying the model element graph for each combination of dependency and dependency type in the dependency information;
    generating, by the management entity, a platform-neutral description of results of the request from the model element graph derived from the sets of model elements, the platform-neutral description being independent of a protocol used by the management entity to collect the data about the communications system;
    executing, by the management entity, the request to collect the data as requested in accordance with the platform-neutral description; and
    storing, by the management entity, the data as collected.

2. The method of claim 1, further comprising:
    processing the data as collected to produce processed data; and
    displaying the processed data.

3. The method of claim 1, wherein parsing the request to collect the data comprises:
    performing morphological pre-processing on the request to produce a first request;
    performing lexical pre-processing on the first request to produce a second request;
    combining the results of the first and second requests to produce a third request;
    parsing the third request to produce the parsed request; and
    generating part-of-speech tokens from the parsed request.

4. The method of claim 3, wherein parsing the request to collect the data further comprises:
    receiving the request; and
    validating the request.

5. The method of claim 1, wherein parsing the request to collect the data comprises:
    performing lexical pre-processing on the request to produce a third request;
    parsing the third request to produce the parsed request; and
    generating part-of-speech tokens from the parsed request.

6. The method of claim 1, wherein generating the sets of model elements comprises:
    extracting the context tokens from the parsed request;
    mapping the context tokens to a first set of model elements;
    extracting the content tokens from the parsed request; and
    mapping the content tokens to a second set of model elements.

7. The method of claim 6, wherein generating the platform-neutral description of the results comprises:
    combining the first set of model elements and the second set of model elements into a combined set of model elements;
    optimizing the combined set of model elements to produce an optimized set of model elements; and
    converting the optimized set of model elements into the platform-neutral description of the results.

8. The method of claim 7, wherein generating the platform-neutral description of the results is augmented by at least one additional annotation.

9. The method of claim 1, wherein the context tokens comprise request metadata.

10. The method of claim 1, wherein the request comprises user-entered metadata, the method further comprising:
    parsing the user-entered metadata to produce context metadata tokens.

11. The method of claim 1, wherein generating the sets of model elements further comprises selecting model elements to use in constructing the model element graph from the links between the context tokens and the content tokens.

12. The method of claim 11, wherein the content tokens comprise content metadata, and wherein the method further comprises:
    parsing the content metadata to produce content metadata tokens.

13. The method of claim 12, further comprising:
    combining user-entered metadata tokens and the content metadata tokens to produce unified metadata tokens.

14. The method of claim 1, further comprising optimizing the modified model element graph after each dependency and dependency type combination.

15. The method of claim 1, further comprising correlating results from analyzing the context metadata tokens and analyzing the model element graph.

16. The method of claim 1, wherein modifying the model element graph comprises:
    for each combination of dependency and dependency type in the dependency information, performing a dependency analysis in accordance with the dependency and dependency type combination to produce a first list of dependencies, and adjusting the model element graph in accordance with the dependency and dependency type combination.

17. The method of claim 16, wherein performing the dependency analysis comprises:

analyzing relationships between the metadata tokens and the content tokens;

retrieving a template for the dependency and dependency type combination;

populating the template;

determining dependencies in the metadata tokens and the content tokens corresponding to the dependency and dependency type combination;

generating an ordered list of dependencies from the determined dependencies;

generating a second list of dependencies from the model element graph; and correlating the ordered list of dependencies and the second list of dependencies to produce the first list of dependencies.

18. The method of claim 1, further comprising displaying the data as collected.

19. The method of claim 18, wherein displaying the data as collected comprises:

matching the data as collected with model elements to identify data that corresponds to model elements of an information model;

optimizing the identified data;

annotating the optimized data; and displaying text present in the identified and annotated data.

20. The method of claim 19, further comprising:

converting the annotated data to an extensible markup language description of the annotated data; and converting the identified data to the extensible markup language description of the annotated data.

21. A management entity comprising:

a memory comprising instructions; and a processor in communication with the memory wherein the processor executes the instructions to:

parse a request to collect data about a communications system for an entity in the communications system, the parsing to produce a parsed request and dependency information, generate sets of model elements in accordance with context tokens and content tokens derived from the parsed request, the content tokens including extrinsic metadata and intrinsic metadata of the parsed request, wherein the processor executing the instructions to generate the sets of model elements comprises the processor executing the instructions to:

evaluate content of the request to collect the data to produce links between context tokens and the content tokens, and map the links into a model element graph, analyze context metadata tokens and content metadata tokens in accordance with the dependency information, analyze the model element graph in accordance with the dependency information, modify the model element graph for each dependency and dependency type in the dependency information, generate a platform-neutral description of results of the request from the model element graph derived from the sets of model elements, the platform-neutral description being independent of a protocol used by the management entity to collect the data about the communications system, and execute the request to collect the data as requested in accordance with the platform-neutral description; and store the data as collected in the memory.

22. The management entity of claim 21, wherein the processor executes the instructions to process the data as collected to produce processed data, and to display the processed data.

23. The management entity of claim 21, wherein the processor executes the instructions to perform morphological pre-processing on the request to produce a first request, to perform lexical pre-processing on the first request to produce a second request, combining the results of the first and second requests to product a third request, to parse the third request to produce the parsed request, and to generate part-of-speech tokens from the parsed request.

24. The management entity of claim 21, wherein the processor executes the instructions to perform lexical pre-processing on the request to produce a third request, to parse the third request to produce the parsed request, and to generate part-of-speech tokens from the parsed request.

25. The management entity of claim 21, wherein the processor executes the instructions to extract the context tokens from the parsed request, to map the context tokens to a first set of model elements, to extract the content tokens from the parsed request, and to map the content tokens to a second set of model elements.

26. The management entity of claim 25, wherein the processor executes the instructions to combine the first set of model elements and the second set of model elements into a combined set of model elements, to optimize the combined set of model elements to produce an optimized set of model elements, and to convert the optimized set of model elements into the platform-neutral description of the results.

27. The management entity of claim 21, wherein the processor, for each dependency and dependency type combination, executes the instructions to perform a dependency analysis in accordance with the dependency and dependency type combination to produce a first list of dependencies, and to adjust the model element graph in accordance with the dependency and dependency type combination.

28. The management entity of claim 27, wherein the processor executes the instructions to analyze relationships between the metadata tokens and the content tokens, to retrieve a template for the dependency and dependency type combination, to populate the template, to determine dependencies in the metadata tokens and the content tokens corresponding to the dependency and dependency type combination, to generate an ordered list of dependencies from the determined dependencies, to generate a second list of dependencies from the model element graph, and to correlate the ordered list of dependencies and the second list of dependencies to produce the first list of dependencies.

29. The management entity of claim 21, wherein the processor executes the instructions to match the data as collected with model elements to identify data that corresponds to model elements of an information model, to optimize the identified data, to annotate the optimized data, and to display text present in the annotated data.

30. A management environment comprising:

a communications system being managed;

a memory storing instructions and data; and a processor in communication with memory wherein the processor executes the instructions to:

parse a request to collect data about the communications system for an entity in the communications system, the parsing to produce a parsed request and dependency information, generate sets of model elements in accordance with context tokens and content tokens derived from the parsed request, the content tokens including extrinsic metadata and intrinsic metadata of the parsed request, wherein the processor executing the instructions to generate the sets of model elements comprises the processor executing the instructions to:

evaluate content of the request to collect the data to produce links between context tokens and the content tokens, and map the links into a model element graph, analyze context metadata tokens and content metadata tokens in accordance with the dependency information, analyze the model element graph in accordance with the dependency information, modify the model element graph for each dependency and dependency type in the dependency information, generate a platform-neutral description of results of the request from the model element graph derived from the sets of model elements, the platform-neutral description being independent of a protocol used by the processor to collect the data about the communications system, and execute the request to collect the data as requested; and store the data as collected in the memory.

31. The management entity of claim 21, wherein the context tokens comprise request metadata.

32. The management entity of claim 21, wherein the request comprises user-entered metadata, and wherein the processor executes the instructions to parse the user-entered metadata to produce context metadata tokens.

33. The management entity of claim 21, wherein the processor executes the instructions to optimize the modified model element graph after each dependency and dependency type combination.

34. The management entity of claim 21, wherein the processor executes the instructions to correlate results from analyzing the context metadata tokens and analyzing the model element graph.

* * * * *